United States Patent
Pervan et al.

(10) Patent No.: US 10,240,348 B2
(45) Date of Patent: Mar. 26, 2019

(54) MECHANICAL LOCKING OF FLOOR PANELS WITH A FLEXIBLE TONGUE

(71) Applicant: VALINGE INNOVATION AB, Viken (SE)

(72) Inventors: Darko Pervan, Viken (SE); Niclas Hakansson, Viken (SE); Per Nygren, Ramlosa (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 14/046,235

(22) Filed: Oct. 4, 2013

(65) Prior Publication Data

US 2014/0053497 A1 Feb. 27, 2014

Related U.S. Application Data

(63) Continuation of application No. 13/670,039, filed on Nov. 6, 2012, which is a continuation of application
(Continued)

(30) Foreign Application Priority Data

Oct. 22, 2004 (EP) .................................... 04025167

(51) Int. Cl.
*E04B 5/32* (2006.01)
*E04B 5/02* (2006.01)
(Continued)

(52) U.S. Cl.
CPC .......... *E04F 15/02038* (2013.01); *E04B 5/00* (2013.01); *E04F 21/22* (2013.01);
(Continued)

(58) Field of Classification Search
CPC ......... E04F 15/12; E04F 15/16; E04F 15/163; E04F 15/166; E04F 15/02038;
(Continued)

(56) References Cited

U.S. PATENT DOCUMENTS

| 87,853 A | 3/1869 | Kappes |
| 108,068 A | 10/1870 | Utley |

(Continued)

FOREIGN PATENT DOCUMENTS

| CA | 2456513 A1 | 2/2003 |
| DE | 138 992 C | 7/1901 |

(Continued)

OTHER PUBLICATIONS

Pervan, Darko, et al., U.S. Appl. No. 14/138,330 entitled "Mechanical Locking System for Floor Panels," filed in the U.S. Patent and Trademark Office on Dec. 23, 2013.
(Continued)

*Primary Examiner* — Phi Dieu Tran
(74) *Attorney, Agent, or Firm* — Buchanan Ingersoll & Rooney P.C.

(57) ABSTRACT

Floor panels which are provided with a mechanical locking system including an extruded flexible tongue in a sidewardly open groove which during a vertical folding motion is bent horizontally. A tongue adapted for being received in a sidewardly open groove of a floor panel, wherein the tongue, which is an elongated extruded section, when received in the groove is bendable in a plane substantially parallel with a front face of the floor panel, such that the tongue is at least partially resiliently displaceable inside said sidewardly open groove in said plane during locking of the floor panel with another floor panel and wherein a vertical protrusion, serving as a friction connection between the tongue and the groove, is arranged at an upper or lower part of the tongue,
(Continued)

wherein the tongue has a total width that varies in the longitudinal direction of the tongue.

12 Claims, 28 Drawing Sheets

Related U.S. Application Data

No. 12/216,892, filed on Jul. 11, 2008, now Pat. No. 8,381,477, which is a continuation of application No. 11/575,600, filed as application No. PCT/SE2005/001586 on Oct. 21, 2005, now Pat. No. 8,341,915.

(51) Int. Cl.
| | |
|---|---|
| *E04F 15/16* | (2006.01) |
| *E04F 15/02* | (2006.01) |
| *E04F 21/22* | (2006.01) |
| *E04B 5/00* | (2006.01) |
| *E04B 1/61* | (2006.01) |
| *E04B 1/58* | (2006.01) |
| *E04F 15/04* | (2006.01) |
| *F16B 5/00* | (2006.01) |

(52) U.S. Cl.
CPC ............... *E04B 1/54* (2013.01); *E04B 1/5818* (2013.01); *E04F 15/04* (2013.01); *E04F 2201/0115* (2013.01); *E04F 2201/0138* (2013.01); *E04F 2201/0146* (2013.01); *E04F 2201/0153* (2013.01); *E04F 2201/0176* (2013.01); *E04F 2201/023* (2013.01); *E04F 2201/042* (2013.01); *E04F 2201/0523* (2013.01); *E04F 2201/0547* (2013.01); *E04F 2201/0576* (2013.01); *E04F 2201/0582* (2013.01); *E04F 2201/0588* (2013.01); *F16B 5/008* (2013.01); *F16B 5/0076* (2013.01)

(58) Field of Classification Search
CPC ............... E04F 15/22; E04F 2201/0115; E04F 2201/0138; E04F 2201/0146; E04F 2201/0153; E04B 5/43; E04B 5/02; E04B 5/18; E04B 5/19; E04B 5/32; E04B 5/326; E04B 1/54; E04B 1/5818; E04B 1/5831; E04B 1/5843
USPC .. 52/586.2, 578, 582.1, 582.2, 586.1, 716.2, 52/717.03, 717.05, 716.1
See application file for complete search history.

(56) References Cited

U.S. PATENT DOCUMENTS

| | | | |
|---|---|---|---|
| 124,228 A | 3/1872 | Stuart | |
| 213,740 A | 4/1879 | Conner | |
| 274,354 A | 3/1883 | McCarthy et al. | |
| 316,176 A | 4/1885 | Ransom | |
| 634,581 A | 10/1899 | Miller | |
| 861,911 A | 7/1907 | Stewart | |
| 1,194,636 A | 8/1916 | Joy | |
| 1,723,306 A | 8/1929 | Sipe | |
| 1,743,492 A | 1/1930 | Sipe | |
| 1,809,393 A | 6/1931 | Rockwell | |
| 1,902,716 A | 3/1933 | Newton | |
| 2,026,511 A | 12/1935 | Storm | |
| 2,110,728 A | 3/1938 | Hoggatt | |
| 2,204,675 A | 6/1940 | Grunert | |
| 2,266,464 A * | 12/1941 | Kraft ........................... 52/586.2 |
| 2,277,758 A | 3/1942 | Hawkins | |
| 2,430,200 A | 11/1947 | Wilson | |
| 2,596,280 A | 5/1952 | Nystrom | |
| 2,732,706 A | 1/1956 | Friedman | |
| 2,740,167 A | 4/1956 | Rowley | |
| 2,858,584 A | 11/1958 | Gaines | |
| 2,863,185 A | 12/1958 | Riedi | |
| 2,865,058 A | 12/1958 | Andersson | |
| 2,889,016 A | 6/1959 | Warren | |
| 3,023,681 A | 3/1962 | Worson | |
| 3,077,703 A | 2/1963 | Bergstrom | |
| 3,099,110 A | 7/1963 | Spaight | |
| 3,147,522 A | 9/1964 | Schumm | |
| 3,187,612 A | 6/1965 | Hervey | |
| 3,271,787 A | 9/1966 | Clary | |
| 3,325,585 A | 6/1967 | Brenneman | |
| 3,331,180 A | 7/1967 | Vissing et al. | |
| 3,378,958 A | 4/1968 | Parks et al. | |
| 3,396,640 A | 8/1968 | Fujihara | |
| 3,512,324 A | 5/1970 | Reed | |
| 3,517,927 A | 6/1970 | Kennel | |
| 3,526,071 A | 9/1970 | Watanabe | |
| 3,535,844 A | 10/1970 | Glaros | |
| 3,572,224 A * | 3/1971 | Perry ............................. 404/40 |
| 3,579,941 A | 5/1971 | Tibbals | |
| 3,720,027 A * | 3/1973 | Christensen ............ E04C 2/243 52/309.8 |
| 3,722,379 A | 3/1973 | Koester | |
| 3,731,445 A | 5/1973 | Hoffmann et al. | |
| 3,742,669 A * | 7/1973 | Mansfeld ................... 52/396.07 |
| 3,760,547 A | 9/1973 | Brenneman | |
| 3,760,548 A * | 9/1973 | Sauer et al. ................. 52/592.1 |
| 3,778,954 A | 12/1973 | Meserole | |
| 3,849,235 A | 11/1974 | Gwynne | |
| 3,919,820 A | 11/1975 | Green | |
| 3,950,915 A | 4/1976 | Cole | |
| 3,994,609 A | 11/1976 | Puccio | |
| 4,007,767 A | 2/1977 | Colledge | |
| 4,007,994 A | 2/1977 | Brown | |
| 4,030,852 A | 6/1977 | Hein | |
| 4,037,377 A | 7/1977 | Howell et al. | |
| 4,041,665 A | 8/1977 | de Munck | |
| 4,064,571 A | 12/1977 | Phipps | |
| 4,080,086 A | 3/1978 | Watson | |
| 4,082,129 A | 4/1978 | Morelock | |
| 4,100,710 A | 7/1978 | Kowallik | |
| 4,104,840 A | 8/1978 | Heintz et al. | |
| 4,107,892 A | 8/1978 | Bellem | |
| 4,113,399 A | 9/1978 | Hansen, Sr. et al. | |
| 4,169,688 A | 10/1979 | Toshio | |
| RE30,154 E | 11/1979 | Jarvis | |
| 4,196,554 A | 4/1980 | Anderson | |
| 4,227,430 A | 10/1980 | Janssen et al. | |
| 4,299,070 A | 11/1981 | Oltmanns | |
| 4,304,083 A | 12/1981 | Anderson | |
| 4,426,820 A | 1/1984 | Terbrack | |
| 4,447,172 A | 5/1984 | Galbreath | |
| 4,512,131 A | 4/1985 | Laramore | |
| 4,599,841 A | 7/1986 | Haid | |
| 4,648,165 A | 3/1987 | Whitehorne | |
| 4,819,932 A | 4/1989 | Trotter, Jr. | |
| 5,007,222 A | 4/1991 | Raymond | |
| 5,026,112 A | 6/1991 | Rice | |
| 5,071,282 A | 12/1991 | Brown | |
| 5,135,597 A | 8/1992 | Barker | |
| 5,148,850 A | 9/1992 | Urbanick | |
| 5,173,012 A | 12/1992 | Ortwein et al. | |
| 5,182,892 A | 2/1993 | Chase | |
| 5,247,773 A | 9/1993 | Weir | |
| 5,272,850 A | 12/1993 | Mysliwiec et al. | |
| 5,274,979 A | 1/1994 | Tsai | |
| 5,295,341 A | 3/1994 | Kajiwara | |
| 5,344,700 A | 9/1994 | McGath et al. | |
| 5,348,778 A | 9/1994 | Knipp et al. | |
| 5,373,674 A | 12/1994 | Winter, IV | |
| 5,465,546 A | 11/1995 | Buse | |
| 5,485,702 A | 1/1996 | Sholton | |
| 5,502,939 A | 4/1996 | Zadok et al. | |
| 5,548,937 A | 8/1996 | Shimonohara | |
| 5,577,357 A | 11/1996 | Civelli | |
| 5,598,682 A | 2/1997 | Haughian | |
| 5,618,602 A | 4/1997 | Nelson | |
| 5,634,309 A | 6/1997 | Polen | |
| 5,658,086 A | 8/1997 | Brokaw et al. | |

(56) References Cited

U.S. PATENT DOCUMENTS

| | | | |
|---|---|---|---|
| 5,694,730 A | 12/1997 | Del Rincon et al. | |
| 5,755,068 A | 5/1998 | Ormiston | |
| 5,860,267 A | 1/1999 | Pervan | |
| 5,899,038 A | 5/1999 | Stroppiana | |
| 5,910,084 A | 6/1999 | Koike | |
| 5,950,389 A | 9/1999 | Porter | |
| 5,970,675 A | 10/1999 | Schray | |
| 6,006,486 A | 12/1999 | Moriau | |
| 6,029,416 A | 2/2000 | Andersson | |
| 6,052,960 A | 4/2000 | Yonemura | |
| 6,065,262 A | 5/2000 | Motta | |
| 6,173,548 B1 | 1/2001 | Hamar et al. | |
| 6,182,410 B1 | 2/2001 | Pervan | |
| 6,203,653 B1 | 3/2001 | Seidner | |
| 6,210,512 B1 | 4/2001 | Jones | |
| 6,254,301 B1 | 7/2001 | Hatch | |
| 6,295,779 B1 | 10/2001 | Canfield | |
| 6,314,701 B1 | 11/2001 | Meyerson | |
| 6,332,733 B1 | 12/2001 | Hamberger et al. | |
| 6,339,908 B1 | 1/2002 | Chuang | |
| 6,345,481 B1 | 2/2002 | Nelson | |
| 6,358,352 B1 | 3/2002 | Schmidt | |
| 6,363,677 B1 | 4/2002 | Chen et al. | |
| 6,385,936 B1 | 5/2002 | Schneider | |
| 6,418,683 B1 | 7/2002 | Martensson et al. | |
| 6,446,413 B1 | 9/2002 | Gruber | |
| 6,449,918 B1 | 9/2002 | Nelson | |
| 6,450,235 B1 | 9/2002 | Lee | |
| 6,490,836 B1 | 12/2002 | Moriau et al. | |
| 6,505,452 B1 | 1/2003 | Hannig | |
| 6,546,691 B2 * | 4/2003 | Leopolder | E04F 15/02 52/590.2 |
| 6,553,724 B1 | 4/2003 | Bigler | |
| 6,576,079 B1 | 6/2003 | Kai | |
| 6,584,747 B2 | 7/2003 | Kettler et al. | |
| 6,591,568 B1 | 7/2003 | Pålsson | |
| 6,601,359 B2 | 8/2003 | Olofsson | |
| 6,617,009 B1 | 9/2003 | Chen et al. | |
| 6,647,689 B2 | 11/2003 | Pletzer | |
| 6,647,690 B1 | 11/2003 | Martensson | |
| 6,651,400 B1 | 11/2003 | Murphy | |
| 6,670,019 B2 | 12/2003 | Andersson | |
| 6,672,030 B2 * | 1/2004 | Schulte | E04F 15/02 52/539 |
| 6,681,820 B2 | 1/2004 | Olofsson | |
| 6,684,592 B2 | 2/2004 | Martin | |
| 6,685,391 B1 | 2/2004 | Gideon | |
| 6,729,091 B1 | 5/2004 | Martensson | |
| 6,763,643 B1 | 7/2004 | Martensson | |
| 6,766,622 B1 | 7/2004 | Thiers | |
| 6,769,219 B2 | 8/2004 | Schwitte et al. | |
| 6,769,835 B2 | 8/2004 | Stridsman | |
| 6,802,166 B1 | 10/2004 | Durnberger | |
| 6,804,926 B1 | 10/2004 | Eisermann | |
| 6,808,777 B2 | 10/2004 | Andersson et al. | |
| 6,854,235 B2 | 2/2005 | Martensson | |
| 6,862,857 B2 | 3/2005 | Tychsen | |
| 6,865,855 B2 | 3/2005 | Knauseder | |
| 6,874,291 B1 | 4/2005 | Weber | |
| 6,880,307 B2 | 4/2005 | Schwitte et al. | |
| 6,948,716 B2 | 9/2005 | Drouin | |
| 7,021,019 B2 | 4/2006 | Knauseder | |
| 7,040,068 B2 | 5/2006 | Moriau et al. | |
| 7,051,486 B2 | 5/2006 | Pervan | |
| 7,108,031 B1 | 9/2006 | Secrest | |
| 7,121,058 B2 | 10/2006 | Pålsson | |
| 7,152,383 B1 | 12/2006 | Wilkinson et al. | |
| 7,188,456 B2 | 3/2007 | Knauseder | |
| 7,219,392 B2 | 5/2007 | Mullet et al. | |
| 7,251,916 B2 | 8/2007 | Konzelmann et al. | |
| 7,337,588 B1 | 3/2008 | Moebus | |
| 7,377,081 B2 | 5/2008 | Ruhdorfer | |
| 7,451,578 B2 * | 11/2008 | Hannig | E04F 15/02 52/392 |
| 7,454,875 B2 | 11/2008 | Pervan et al. | |
| 7,516,588 B2 | 4/2009 | Pervan | |
| 7,517,427 B2 | 4/2009 | Sjoberg et al. | |
| 7,533,500 B2 | 5/2009 | Morton et al. | |
| 7,556,849 B2 | 7/2009 | Thompson et al. | |
| 7,568,322 B2 | 8/2009 | Pervan | |
| 7,584,583 B2 | 9/2009 | Bergelin et al. | |
| 7,614,197 B2 * | 11/2009 | Nelson | E04F 15/04 52/461 |
| 7,617,651 B2 | 11/2009 | Grafenauer | |
| 7,634,884 B2 | 12/2009 | Pervan | |
| 7,637,068 B2 | 12/2009 | Pervan | |
| 7,644,553 B2 | 1/2010 | Knauseder | |
| 7,677,005 B2 | 3/2010 | Pervan | |
| 7,716,889 B2 | 5/2010 | Pervan | |
| 7,721,503 B2 | 5/2010 | Pervan et al. | |
| 7,726,088 B2 | 6/2010 | Muehlebach | |
| 7,757,452 B2 | 7/2010 | Pervan | |
| 7,802,411 B2 | 9/2010 | Pervan | |
| 7,806,624 B2 | 10/2010 | McLean et al. | |
| 7,841,144 B2 | 11/2010 | Pervan et al. | |
| 7,841,145 B2 | 11/2010 | Pervan et al. | |
| 7,841,150 B2 | 11/2010 | Pervan | |
| 7,856,789 B2 | 12/2010 | Eisermann | |
| 7,861,482 B2 | 1/2011 | Pervan et al. | |
| 7,866,110 B2 | 1/2011 | Pervan | |
| 7,908,815 B2 | 3/2011 | Pervan et al. | |
| 7,908,816 B2 | 3/2011 | Grafenauer | |
| 7,930,862 B2 | 4/2011 | Bergelin et al. | |
| 7,954,295 B2 | 6/2011 | Pervan | |
| 7,980,041 B2 | 7/2011 | Pervan | |
| 8,006,458 B1 | 8/2011 | Olofsson et al. | |
| 8,033,074 B2 | 10/2011 | Pervan | |
| 8,042,311 B2 | 10/2011 | Pervan | |
| 8,061,104 B2 | 11/2011 | Pervan | |
| 8,079,196 B2 | 12/2011 | Pervan | |
| 8,112,967 B2 | 2/2012 | Pervan et al. | |
| 8,171,692 B2 | 5/2012 | Pervan | |
| 8,181,416 B2 | 5/2012 | Pervan et al. | |
| 8,234,830 B2 | 8/2012 | Pervan et al. | |
| 8,245,478 B2 | 8/2012 | Bergelin | |
| 8,341,914 B2 | 1/2013 | Pervan et al. | |
| 8,341,915 B2 | 1/2013 | Pervan et al. | |
| 8,353,140 B2 | 1/2013 | Pervan et al. | |
| 8,359,805 B2 | 1/2013 | Pervan et al. | |
| 8,375,673 B2 * | 2/2013 | Evjen | E04F 15/04 52/588.1 |
| 8,381,477 B2 | 2/2013 | Pervan et al. | |
| 8,387,327 B2 | 3/2013 | Pervan | |
| 8,448,402 B2 | 5/2013 | Pervan et al. | |
| 8,499,521 B2 | 8/2013 | Pervan et al. | |
| 8,505,257 B2 | 8/2013 | Boo et al. | |
| 8,511,031 B2 | 8/2013 | Bergelin et al. | |
| 8,528,289 B2 | 9/2013 | Pervan et al. | |
| 8,544,230 B2 | 10/2013 | Pervan | |
| 8,544,234 B2 | 10/2013 | Pervan et al. | |
| 8,572,922 B2 | 11/2013 | Pervan | |
| 8,578,675 B2 | 11/2013 | Palsson et al. | |
| 8,596,013 B2 | 12/2013 | Boo | |
| 8,627,862 B2 | 1/2014 | Pervan et al. | |
| 8,640,424 B2 | 2/2014 | Pervan et al. | |
| 8,650,826 B2 | 2/2014 | Pervan et al. | |
| 8,677,714 B2 | 3/2014 | Pervan | |
| 8,689,512 B2 | 4/2014 | Pervan | |
| 8,707,650 B2 | 4/2014 | Pervan et al. | |
| 8,713,886 B2 | 5/2014 | Boo et al. | |
| 8,733,065 B2 | 5/2014 | Pervan | |
| 8,733,410 B2 | 5/2014 | Pervan | |
| 8,763,341 B2 | 7/2014 | Pervan | |
| 8,769,905 B2 | 7/2014 | Pervan | |
| 8,776,473 B2 | 7/2014 | Pervan et al. | |
| 8,844,236 B2 | 9/2014 | Pervan et al. | |
| 8,857,126 B2 | 10/2014 | Pervan et al. | |
| 8,869,485 B2 | 10/2014 | Pervan | |
| 8,887,468 B2 | 11/2014 | Hakansson et al. | |
| 8,898,988 B2 | 12/2014 | Pervan | |
| 8,925,274 B2 | 1/2015 | Pervan et al. | |
| 8,959,866 B2 | 2/2015 | Pervan | |
| 8,973,331 B2 | 3/2015 | Boo | |
| 8,997,423 B2 | 4/2015 | Mann | |

(56) References Cited

U.S. PATENT DOCUMENTS

| | | |
|---|---|---|
| 9,027,306 B2 | 5/2015 | Pervan |
| 9,051,738 B2 | 6/2015 | Pervan et al. |
| 9,068,360 B2 | 6/2015 | Pervan |
| 9,091,077 B2 | 7/2015 | Boo |
| 9,194,134 B2 | 11/2015 | Nygren et al. |
| 9,212,492 B2 | 12/2015 | Pervan et al. |
| 9,216,541 B2 | 12/2015 | Boo et al. |
| 9,238,917 B2 | 1/2016 | Pervan et al. |
| 9,284,737 B2 | 3/2016 | Pervan et al. |
| 9,309,679 B2 | 4/2016 | Pervan et al. |
| 9,316,002 B2 | 4/2016 | Boo |
| 9,340,974 B2 | 5/2016 | Pervan et al. |
| 9,347,469 B2 | 5/2016 | Pervan |
| 9,359,774 B2 | 6/2016 | Pervan |
| 9,366,036 B2 | 6/2016 | Pervan |
| 9,376,821 B2 | 6/2016 | Pervan et al. |
| 9,382,716 B2 | 7/2016 | Pervan et al. |
| 9,388,584 B2 | 7/2016 | Pervan et al. |
| 9,428,919 B2 | 8/2016 | Pervan et al. |
| 9,453,347 B2 | 9/2016 | Pervan et al. |
| 9,458,634 B2 | 10/2016 | Derelov |
| 9,482,012 B2 | 11/2016 | Nygren et al. |
| 9,540,826 B2 | 1/2017 | Pervan et al. |
| 9,663,940 B2 | 5/2017 | Boo |
| 9,725,912 B2 | 8/2017 | Pervan |
| 9,803,374 B2 | 10/2017 | Pervan |
| 9,803,375 B2 | 10/2017 | Pervan |
| 10,113,319 B2 | 10/2018 | Pervan |
| 2001/0024707 A1 | 9/2001 | Andersson et al. |
| 2001/0034991 A1* | 11/2001 | Martensson .......... E04B 1/6129 52/578 |
| 2001/0045150 A1 | 11/2001 | Owens |
| 2002/0014047 A1* | 2/2002 | Thiers ...................... B44C 1/24 52/313 |
| 2002/0031646 A1 | 3/2002 | Chen et al. |
| 2002/0069611 A1 | 6/2002 | Leopolder |
| 2002/0092263 A1 | 7/2002 | Schulte |
| 2002/0108343 A1 | 8/2002 | Knauseder |
| 2002/0170258 A1 | 11/2002 | Schwitte et al. |
| 2002/0170259 A1 | 11/2002 | Ferris |
| 2002/0178674 A1 | 12/2002 | Pervan |
| 2002/0178680 A1 | 12/2002 | Martensson |
| 2002/0189190 A1 | 12/2002 | Charmat et al. |
| 2002/0194807 A1 | 12/2002 | Nelson et al. |
| 2003/0009971 A1 | 1/2003 | Palmberg |
| 2003/0024199 A1 | 2/2003 | Pervan et al. |
| 2003/0037504 A1 | 2/2003 | Schwitte et al. |
| 2003/0084636 A1 | 5/2003 | Pervan |
| 2003/0094230 A1 | 5/2003 | Sjoberg |
| 2003/0101681 A1 | 6/2003 | Tychsen |
| 2003/0145549 A1 | 8/2003 | Palsson et al. |
| 2003/0180091 A1 | 9/2003 | Stridsman |
| 2003/0188504 A1 | 10/2003 | Ralf |
| 2003/0196405 A1 | 10/2003 | Pervan |
| 2004/0016196 A1 | 1/2004 | Pervan |
| 2004/0031227 A1 | 2/2004 | Knauseder |
| 2004/0049999 A1 | 3/2004 | Krieger |
| 2004/0060255 A1 | 4/2004 | Knauseder |
| 2004/0068954 A1 | 4/2004 | Martensson |
| 2004/0123548 A1 | 7/2004 | Gimpel et al. |
| 2004/0128934 A1 | 7/2004 | Hecht |
| 2004/0139676 A1 | 7/2004 | Knauseder |
| 2004/0139678 A1 | 7/2004 | Pervan |
| 2004/0159066 A1 | 8/2004 | Thiers et al. |
| 2004/0168392 A1 | 9/2004 | Konzelmann et al. |
| 2004/0177584 A1 | 9/2004 | Pervan |
| 2004/0182033 A1 | 9/2004 | Wernersson |
| 2004/0182036 A1 | 9/2004 | Sjoberg et al. |
| 2004/0200175 A1 | 10/2004 | Weber |
| 2004/0211143 A1 | 10/2004 | Hanning |
| 2004/0244325 A1 | 12/2004 | Nelson |
| 2004/0250492 A1 | 12/2004 | Becker |
| 2004/0261348 A1 | 12/2004 | Vulin |
| 2005/0003132 A1 | 1/2005 | Blix et al. |
| 2005/0028474 A1 | 2/2005 | Kim |
| 2005/0050827 A1 | 3/2005 | Schitter |
| 2005/0160694 A1 | 7/2005 | Pervan |
| 2005/0166514 A1 | 8/2005 | Pervan |
| 2005/0205161 A1 | 9/2005 | Lewark |
| 2005/0210810 A1 | 9/2005 | Pervan |
| 2005/0235593 A1 | 10/2005 | Hecht |
| 2005/0252130 A1 | 11/2005 | Martensson |
| 2005/0268570 A2 | 12/2005 | Pervan |
| 2006/0053724 A1 | 3/2006 | Braun et al. |
| 2006/0070333 A1 | 4/2006 | Pervan |
| 2006/0101769 A1 | 5/2006 | Pervan et al. |
| 2006/0156670 A1 | 7/2006 | Knauseder |
| 2006/0174577 A1 | 8/2006 | O'Neil |
| 2006/0179754 A1 | 8/2006 | Yang |
| 2006/0236642 A1 | 10/2006 | Pervan |
| 2006/0260254 A1 | 11/2006 | Pervan |
| 2006/0272262 A1 | 12/2006 | Pomberger |
| 2007/0006543 A1 | 1/2007 | Engstrom |
| 2007/0011981 A1 | 1/2007 | Eisermann |
| 2007/0028547 A1 | 2/2007 | Grafenauer |
| 2007/0065293 A1 | 3/2007 | Hannig |
| 2007/0175156 A1 | 8/2007 | Pervan et al. |
| 2008/0000182 A1 | 1/2008 | Pervan |
| 2008/0000186 A1 | 1/2008 | Pervan et al. |
| 2008/0000187 A1 | 1/2008 | Pervan et al. |
| 2008/0005998 A1 | 1/2008 | Pervan |
| 2008/0010931 A1 | 1/2008 | Pervan et al. |
| 2008/0010937 A1 | 1/2008 | Pervan et al. |
| 2008/0028707 A1 | 2/2008 | Pervan |
| 2008/0034708 A1 | 2/2008 | Pervan |
| 2008/0041008 A1 | 2/2008 | Pervan |
| 2008/0066415 A1 | 3/2008 | Pervan |
| 2008/0104921 A1 | 5/2008 | Pervan et al. |
| 2008/0110125 A1 | 5/2008 | Pervan |
| 2008/0134607 A1 | 6/2008 | Pervan et al. |
| 2008/0134613 A1 | 6/2008 | Pervan |
| 2008/0134614 A1 | 6/2008 | Pervan |
| 2008/0155930 A1 | 7/2008 | Pervan et al. |
| 2008/0216434 A1 | 9/2008 | Pervan |
| 2008/0216920 A1 | 9/2008 | Pervan |
| 2008/0295432 A1 | 12/2008 | Pervan et al. |
| 2008/0302044 A1 | 12/2008 | Johansson |
| 2009/0133353 A1 | 5/2009 | Pervan et al. |
| 2009/0193748 A1 | 8/2009 | Boo et al. |
| 2010/0293879 A1 | 11/2010 | Pervan et al. |
| 2010/0300031 A1 | 12/2010 | Pervan et al. |
| 2010/0319290 A1 | 12/2010 | Pervan |
| 2010/0319291 A1 | 12/2010 | Pervan et al. |
| 2011/0030303 A1 | 2/2011 | Pervan et al. |
| 2011/0041996 A1 | 2/2011 | Pervan |
| 2011/0088344 A1 | 4/2011 | Pervan et al. |
| 2011/0088345 A1 | 4/2011 | Pervan |
| 2011/0088346 A1 | 4/2011 | Hannig |
| 2011/0154763 A1 | 6/2011 | Bergelin et al. |
| 2011/0167750 A1 | 7/2011 | Pervan |
| 2011/0167751 A1 | 7/2011 | Engstrom |
| 2011/0197535 A1 | 8/2011 | Baker et al. |
| 2011/0225922 A1 | 9/2011 | Pervan et al. |
| 2011/0252733 A1 | 10/2011 | Pervan |
| 2011/0283650 A1 | 11/2011 | Pervan et al. |
| 2012/0017533 A1 | 1/2012 | Pervan et al. |
| 2012/0031029 A1 | 2/2012 | Pervan et al. |
| 2012/0036804 A1 | 2/2012 | Pervan |
| 2012/0151865 A1 | 6/2012 | Pervan et al. |
| 2012/0174515 A1 | 7/2012 | Pervan |
| 2012/0174520 A1 | 7/2012 | Pervan |
| 2012/0279161 A1 | 11/2012 | Håkansson et al. |
| 2013/0008117 A1 | 1/2013 | Pervan |
| 2013/0014463 A1 | 1/2013 | Pervan |
| 2013/0019555 A1 | 1/2013 | Pervan |
| 2013/0042562 A1 | 2/2013 | Pervan |
| 2013/0042563 A1 | 2/2013 | Pervan |
| 2013/0042564 A1 | 2/2013 | Pervan |
| 2013/0042565 A1 | 2/2013 | Pervan |
| 2013/0047536 A1 | 2/2013 | Pervan |
| 2013/0081349 A1 | 4/2013 | Pervan et al. |
| 2013/0111845 A1 | 5/2013 | Pervan |
| 2013/0145708 A1 | 6/2013 | Pervan |
| 2013/0160391 A1 | 6/2013 | Pervan et al. |

(56) References Cited

U.S. PATENT DOCUMENTS

| | | |
|---|---|---|
| 2013/0232905 A2 | 9/2013 | Pervan |
| 2013/0239508 A1 | 9/2013 | Pervan et al. |
| 2013/0263454 A1 | 10/2013 | Boo |
| 2013/0263547 A1 | 10/2013 | Boo |
| 2013/0318906 A1 | 12/2013 | Pervan et al. |
| 2014/0007539 A1 | 1/2014 | Pervan et al. |
| 2014/0020324 A1 | 1/2014 | Pervan |
| 2014/0033634 A1 | 2/2014 | Pervan |
| 2014/0059966 A1 | 3/2014 | Boo |
| 2014/0069043 A1 | 3/2014 | Pervan |
| 2014/0090335 A1 | 4/2014 | Pervan et al. |
| 2014/0109501 A1 | 4/2014 | Pervan |
| 2014/0109506 A1 | 4/2014 | Pervan et al. |
| 2014/0123586 A1 | 5/2014 | Pervan et al. |
| 2014/0150369 A1 | 6/2014 | Hannig |
| 2014/0190112 A1 | 7/2014 | Pervan |
| 2014/0208677 A1 | 7/2014 | Pervan et al. |
| 2014/0223852 A1 | 8/2014 | Pervan |
| 2014/0237931 A1 | 8/2014 | Pervan |
| 2014/0250813 A1 | 9/2014 | Nygren et al. |
| 2014/0260060 A1 | 9/2014 | Pervan et al. |
| 2014/0305065 A1 | 10/2014 | Pervan |
| 2014/0366476 A1 | 12/2014 | Pervan |
| 2014/0373478 A2 | 12/2014 | Pervan et al. |
| 2014/0373480 A1 | 12/2014 | Pervan et al. |
| 2015/0000221 A1 | 1/2015 | Boo |
| 2015/0013260 A1 | 1/2015 | Pervan |
| 2015/0059281 A1 | 3/2015 | Pervan |
| 2015/0089896 A2 | 4/2015 | Pervan et al. |
| 2015/0121796 A1 | 5/2015 | Pervan |
| 2015/0152644 A1 | 6/2015 | Boo |
| 2015/0167318 A1 | 6/2015 | Pervan |
| 2015/0211239 A1 | 7/2015 | Pervan |
| 2015/0233125 A1 | 8/2015 | Pervan et al. |
| 2015/0267419 A1 | 9/2015 | Pervan |
| 2015/0300029 A1 | 10/2015 | Pervan |
| 2015/0330088 A1 | 11/2015 | Derelöv |
| 2015/0337537 A1 | 11/2015 | Boo |
| 2016/0032596 A1 | 2/2016 | Nygren et al. |
| 2016/0060879 A1 | 3/2016 | Pervan |
| 2016/0069088 A1 | 3/2016 | Boo et al. |
| 2016/0076260 A1 | 3/2016 | Pervan et al. |
| 2016/0090744 A1 | 3/2016 | Pervan et al. |
| 2016/0153200 A1 | 6/2016 | Pervan |
| 2016/0168866 A1 | 6/2016 | Pervan et al. |
| 2016/0186426 A1 | 6/2016 | Boo |
| 2016/0194884 A1 | 7/2016 | Pervan et al. |
| 2016/0201336 A1 | 7/2016 | Pervan |
| 2016/0251859 A1 | 9/2016 | Pervan et al. |
| 2016/0251860 A1 | 9/2016 | Pervan |
| 2016/0281368 A1 | 9/2016 | Pervan et al. |
| 2016/0281370 A1 | 9/2016 | Pervan et al. |
| 2016/0326751 A1 | 11/2016 | Pervan |
| 2016/0340913 A1 | 11/2016 | Derelöv |
| 2017/0037641 A1 | 2/2017 | Nygren et al. |
| 2017/0081860 A1 | 3/2017 | Boo |
| 2017/0321433 A1 | 11/2017 | Pervan et al. |
| 2018/0030737 A1 | 2/2018 | Pervan |
| 2018/0030738 A1 | 2/2018 | Pervan |

FOREIGN PATENT DOCUMENTS

| | | | |
|---|---|---|---|
| DE | 142 293 C | 7/1902 | |
| DE | 2 159 042 | 6/1973 | |
| DE | 25 05 489 A1 | 8/1976 | |
| DE | 33 43 601 A1 | 6/1985 | |
| DE | 33 43 601 C2 | 6/1985 | |
| DE | 39 32 980 A1 | 11/1991 | |
| DE | 42 15 273 A1 | 11/1993 | |
| DE | 42 42 530 A1 | 6/1994 | |
| DE | 196 01 322 A | 5/1997 | |
| DE | 299 22 649 U1 | 4/2000 | |
| DE | 200 01 788 U1 | 6/2000 | |
| DE | 200 02 744 U1 | 8/2000 | |
| DE | 199 40 837 A1 | 11/2000 | |
| DE | 199 58 225 A1 | 6/2001 | |
| DE | 202 05 774 U1 | 8/2002 | |
| DE | 203 20 799 U1 | 4/2005 | |
| DE | 10 2004 055 951 A1 | 7/2005 | |
| DE | 10 2004 001 363 A1 | 8/2005 | |
| DE | 10 2005 002 297 A1 | 8/2005 | |
| EP | 0 013 852 A1 | 8/1980 | |
| EP | 13852 A1 * | 8/1980 | ............... E06B 3/70 |
| EP | 0 871 156 A2 | 10/1998 | |
| EP | 0 974 713 A1 | 1/2000 | |
| EP | 1 120 515 A1 | 8/2001 | |
| EP | 1 146 182 A2 | 10/2001 | |
| EP | 1 251 219 A | 10/2002 | |
| EP | 1 350 904 A2 | 10/2003 | |
| EP | 1 350 904 A3 | 10/2003 | |
| EP | 1 420 125 A2 | 5/2004 | |
| EP | 1 437 457 A2 | 7/2004 | |
| FR | 1.138.595 | 6/1957 | |
| FR | 2 256 807 | 8/1975 | |
| FR | 2 810 060 A1 | 12/2001 | |
| GB | 240629 | 10/1925 | |
| GB | 376352 | 7/1932 | |
| GB | 1171337 | 11/1969 | |
| GB | 2 051 916 A | 1/1981 | |
| GB | 2051916 A * | 1/1981 | ............... E04B 2/72 |
| JP | 03-110258 A | 5/1991 | |
| JP | 05-018028 A | 1/1993 | |
| JP | 6-146553 A | 5/1994 | |
| JP | 6-288017 A | 10/1994 | |
| JP | 6-306961 A | 11/1994 | |
| JP | 6-322848 A | 11/1994 | |
| JP | 7-300979 A | 11/1995 | |
| SE | 526 688 C2 | 5/2005 | |
| WO | WO 94/26999 A1 | 11/1994 | |
| WO | WO 96/23942 A1 | 8/1996 | |
| WO | WO 96/27721 A1 | 9/1996 | |
| WO | WO 97/47834 A1 | 12/1997 | |
| WO | WO 98/21428 A1 | 5/1998 | |
| WO | WO 98/22677 A1 | 5/1998 | |
| WO | WO 98/58142 A1 | 12/1998 | |
| WO | WO 99/66151 A1 | 12/1999 | |
| WO | WO 99/66152 A1 | 12/1999 | |
| WO | WO 00/20705 A1 | 4/2000 | |
| WO | WO 00/20706 A1 | 4/2000 | |
| WO | WO 00/43281 A2 | 7/2000 | |
| WO | WO 00/47841 | 8/2000 | |
| WO | WO 00/55067 A1 | 9/2000 | |
| WO | WO 01/02669 A1 | 1/2001 | |
| WO | WO 01/02670 A1 | 1/2001 | |
| WO | WO 01/02671 A1 | 1/2001 | |
| WO | WO 01/02672 A1 | 1/2001 | |
| WO | WO 01/07729 A1 | 2/2001 | |
| WO | WO 01/038657 A1 | 5/2001 | |
| WO | WO 01/44669 A2 | 6/2001 | |
| WO | WO 01/44669 A3 | 6/2001 | |
| WO | WO 01/48331 A1 | 7/2001 | |
| WO | WO 01/48332 A1 | 7/2001 | |
| WO | WO 01/51732 A1 | 7/2001 | |
| WO | WO 01/51733 A1 | 7/2001 | |
| WO | WO 01/66877 A1 | 9/2001 | |
| WO | WO 01/75247 A1 | 10/2001 | |
| WO | WO 01/77461 A1 | 10/2001 | |
| WO | WO 01/94721 A1 | 12/2001 | |
| WO | WO 01/94721 A8 | 12/2001 | |
| WO | WO 01/98604 A1 | 12/2001 | |
| WO | WO 02/048127 | 6/2002 | |
| WO | WO 02/055809 A1 | 7/2002 | |
| WO | WO 02/055810 A1 | 7/2002 | |
| WO | WO 02/081843 A1 | 10/2002 | |
| WO | WO 02/103135 A1 | 12/2002 | |
| WO | WO 03/012224 A1 | 2/2003 | |
| WO | WO 03/016654 A1 | 2/2003 | |
| WO | WO 03/025307 A1 | 3/2003 | |
| WO | WO 03/038210 A1 | 5/2003 | |
| WO | WO 03/044303 A1 | 5/2003 | |
| WO | WO 03/069094 A1 | 8/2003 | |
| WO | WO 03/074814 A1 | 9/2003 | |
| WO | WO 03/083234 A1 | 10/2003 | |
| WO | WO 03/087497 A1 | 10/2003 | |

(56) References Cited

FOREIGN PATENT DOCUMENTS

| WO | WO 03/089736 A1 | 10/2003 |
|---|---|---|
| WO | WO 2004/016877 A1 | 2/2004 |
| WO | WO 2004/020764 A1 | 3/2004 |
| WO | WO 2004/048716 A1 | 6/2004 |
| WO | WO 2004/050780 A2 | 6/2004 |
| WO | WO 2004/079128 A1 | 9/2004 |
| WO | WO 2004/079130 A1 | 9/2004 |
| WO | WO 2004/083557 A1 | 9/2004 |
| WO | WO 2004/085765 A1 | 10/2004 |
| WO | WO 2005/003488 A1 | 1/2005 |
| WO | WO 2005/003489 A1 | 1/2005 |
| WO | WO 2005/054599 A1 | 6/2005 |
| WO | WO 2006/043893 A1 | 4/2006 |
| WO | WO 2006/104436 A1 | 10/2006 |
| WO | WO 2006/123988 A1 | 11/2006 |
| WO | WO 2007/015669 A2 | 2/2007 |

OTHER PUBLICATIONS

Pervan, Darko, U.S. Appl. No. 14/138,385 entitled "Mechanical Locking System for Panels and Method of Installing Same," filed in the U.S. Patent and Trademark Office on Dec. 23, 2013.

Pervan, Darko, et al., U.S. Appl. No. 14/152,402 entitled "Mechanical Locking System for Floor Panels," filed in the U.S. Patent and Trademark Office on Jan. 10, 2014.

Pervan, Darko, et al., U.S. Appl. No. 14/095,052, entitled "Mechanical Locking of Floor Panels," filed in the U.S. Patent and Trademark Office on Dec. 3, 2013.

Pervan, Darko, et al., U.S. Appl. No. 13/962,446, entitled "Mechanical Locking System for Floor Panels," filed in the U.S. Patent and Trademark Office on Aug. 8, 2013.

Pervan, Darko, U.S. Appl. No. 14/011,042 entitled "Mechanical Locking System for Floor Panels," filed in the U.S. Patent and Trademark Office on Aug. 27, 2013.

Pervan, Darko, U.S. Appl. No. 14/042,887 entitled "Mechanical Locking of Floor Panels with a Glued Tongue," filed in the U.S. Patent and Trademark Office on Oct. 1, 2013.

Nygren, Per, et al., U.S. Appl. No. 61/774,749, entitled "Building Panels Provided with a Mechanical Locking System," filed in the U.S. Patent and Trademark Office on Mar. 8, 2013.

Pervan, Darko, U.S. Appl. No. 14/080,105 entitled "Mechanical Locking of Floor Panels with Vertical Folding," filed in the U.S. Patent and Trademark Office on Nov. 14, 2013.

International Search Report dated Feb. 7, 2006 in PCT/SE2005/001586, Swedish Patent Office, Stockholm, Sweden, 6 pages.

European Search Report (ESR) for European Patent Application No. 04025167.0, filed Oct. 22, 2004, published as EP 1 650 375 A1, dated Apr. 26, 2006.

International Search Report dated Jun. 14, 2006 in PCT/SE2006/000033, Swedish Patent Office, Stockholm, Sweden, 8 pages.

Laminate Flooring Tips (http://flooring.lifetips.com/cat/61734/laminate-flooring-tips/index.html). Copyright 2000. 12 pages.

Complaint, *Akzenta Paneele + Profile GmbH and W. Classen GmbH & Co. KG v. Brown-West L.L.C. d/b/a Carpet One Floor & Home, Shaw Industries Group, Inc. and Valinge Innovation AB*, United States District Court for the Eastern District of Texas, Marshall Division, Case No. 2:10-CV-16, dated Jan. 14, 2010.

Answer, Affirmative Defenses and Counterclaims of Defendant *Välinge Innovation AB, Akzenta Paneele + Profile GmbH and W. Classen GmbH & Co. KG v. Brown-West L.L.C. d/b/a Carpet One Floor & Home, Shaw Industries Group, Inc. and Valinge Innovation AB*, United States District Court for the Eastern District of Texas, Marshall Division, Case No. 2:10-CV-00016 (TWG)(CE), dated Apr. 9, 2010.

Plaintiff's First Amended Complaint and Counterclaim on Reply, *Akzenta Paneele + Profile GmbH and W. Classen GmbH & Co. KG v. Shaw Industries Group, Inc. and Valinge Innovation AB and Darko Pervan*, United States District Court for the Eastern District of Texas, Marshall Division, Case No. 2:10-CV-16, dated Nov. 30, 2010, and attachments thereto.

European prosecution file history, European Patent No. 1863984 (Appln. No. 06700664), dated Oct. 5, 2006 to Sep. 9, 2010.

Shaw Industries Group, Inc.'s Answer, Defenses and Counterclaims to Plaintiffs' First Amended Complaint and Counterclaim on Reply, *Akzenta Paneele + Profile GmbH, Akzenta Vertriebs GmbH and W. Classen GmbH & Co. KG v. Shaw Industries Group, Inc. and Välinge Innovation AB and Darko Pervan*, United States District Court for the Eastern District of Texas, Marshall Division, Case No. 2:10-CV-00016 (TJW)(CE), dated Jan. 7, 2011.

Answer, Affirmative Defenses and Counterclaims of Defendant Välinge Innovation AB to Plaintiffs' First Amended Complaint and Counterclaim on Reply, *Akzenta Paneele + Profile GmbH, Akzenta Vertriebs GmbH and W. Classen GmbH &Co. KG v. Shaw Industries Group, Inc. and Välinge Innovation AB and Darko Pervan*, United States District Court for the Eastern District of Texas, Marshall Division, Case No. 2:10-CV-00016 (TJW)(CE), dated Jan. 7, 2011.

Pervan, Darko, et al., U.S. Appl. No. 14/206,286, entitled "Mechanical Locking System for Panels and Method of Installing Same," filed in the U.S. Patent and Trademark Office on Mar. 12 2014.

Pervan, Darko, U.S. Appl. No. 14/270,711, entitled "Mechanical Locking System for Floor Panels," filed in the U.S. Patent and Trademark Office on May 6, 2014.

Pervan, Darko, U.S. Appl. No. 14/597,578 entitled "Mechanical Locking of Floor Panels with a Glued Tongue," filed in the U.S. Patent and Trademark Office on Jan. 15, 2015.

Pervan, Darko, et al., U.S. Appl. No. 14/294,230, entitled "Mechanical Locking System for Floor Panels," filed in the U.S. Patent and Trademark Office on Jun. 3, 2014.

Pervan, Darko, U.S. Appl. No. 14/294,623, entitled "Mechanical Locking of Floor Panels with Vertical Folding," filed in the U.S. Patent and Trademark Office Jun. 3, 2014.

Boo, Christian, U.S. Appl. No. 14/315,879, entitled "Building Panel With a Mechanical Locking System," filed in the U.S. Patent and Trademark Office on Jun. 26, 2014

Pervan, Darko, et al., U.S. Appl. No. 14/463,972, entitled "Mechanical Locking of Floor Panels with a Flexible Bristle Tongue," filed in the U.S. Patent and Trademark Office on Aug. 20, 2014.

Pervan, Darko, et al., U.S. Appl. No. 14/483,352, entitled "Mechanical Locking System for Floor Panels," filed in the U.S. Patent and Trademark Office on Sep. 11, 2014.

Pervan, Darko, U.S. Appl. No. 14/538,223, entitled "Mechanical Locking System for Floor Panels," filed in the U.S. Patent and Trademark Office on Nov. 11, 2014.

Pervan, Darko, U.S. Appl. No. 14/730,691 entitled "Mechanical Locking System for Panels and Method for Installing Same," filed in the U.S. Patent and Trademark Office on Jun. 4, 2015.

Derelov, Peter, U.S. Appl. No. 14/709,913 entitled "Building Panel with a Mechanical Locking System," filed in the U.S. Patent and Trademark Office on May 12, 2015.

Pervan, Darko, U.S. Appl. No. 14/633,480, entitled "Mechanical Locking of Floor Panels with Vertical Folding," filed in the U.S. Patent and Trademark Office on Feb. 27, 2015.

Pervan, Darko, U.S. Appl. No. 14/683,340 entitled "Mechanical Locking System for Floor Panels," filed in the U.S. Patent and Trademark Office on Apr. 10, 2015.

Pervan, Darko, et al., U.S. Appl. No. 14/701,959 entitled "Mechanical Locking system for Floor Panels," filed in the U.S. Patent and Trademark Office on May 1, 2015.

Pervan, Darko, U.S. Appl. No. 14/646,567 entitled "Mechanical Locking System for Floor Panels," filed in the U.S. Patent and Trademark Office on May 21, 2015.

Pervan, Darko, et al., U.S. Appl. No. 14/962,291, entitled "Mechanical Locking System for Floor Panels," filed in the U.S. Patent and Trademark Office on Dec. 8, 2015.

Pervan, Darko, U.S. Appl. No. 14/938,612, entitled "Mechanical Locking System for Floor Panels," filed in the U.S. Patent and Trademark Office on Nov. 11, 2015.

Pervan, Darko, U.S. Appl. No. 14/951,976, entitled "Mechanical Locking System for Floor Panels," filed in the U.S. Patent and Trademark Office on Nov. 25, 2015.

(56) References Cited

OTHER PUBLICATIONS

Pervan, Darko, et al., U.S. Appl. No. 15/048,252, entitled "Mechanical Locking System for Floor Panels," filed in the U.S. Patent and Trademark Office Feb. 19, 2016.
Pervan, Darko, U.S. Appl. No. 15/148,820, entitled "Mechanical Locking System for Panels and Method of Installing Same," filed in the U.S. Patent and Trademark Office May 6, 2016.
Pervan, Darko, U.S. Appl. No. 15/160,311, entitled "Mechanical Locking System for Floor Panels," filed in the U.S. Patent and Trademark Office May 20, 2016.
Pervan, Darko, et al., U.S. Appl. No. 15/172,926, entitled "Mechanical Locking of Floor Panels with a Flexible Bristle Tongue," filed in the U.S. Patent and Trademark Office on Jun. 3, 2016.
Pervan, Darko, et al., U.S. Appl. No. 15/175,768, entitled "Mechanical Locking System for Floor Panels," filed in the U.S. Patent and Trademark Office on Jun. 7, 2016.
Pervan, Darko, et al., U.S. Appl. No. 15/217,023, entitled "Mechanical Locking System for Floor Panels," filed in the U.S. Patent and Trademark Office on Jul. 22, 2016.
Pervan, Darko, U.S. Appl. No. 15/261,071, entitled "Mechanical Locking System for Floor Panels," filed in the U.S. Patent and Trademark Office on Sep. 9, 2016.
Extended European Search Report issued in EP 04 02 5167, dated Jan. 27, 2005, European Patent Office, Munich, DE, 3 pages.
Extended European Search Report issued in EP 05796804.2, dated Sep. 29, 2008, European Patent Office, Munich, DE, 11 pages.
Extended European Search Report issued in EP 07150233.0, dated Jul. 22, 2009, European Patent Office, Munich, DE, 7 pages.
Extended European Search Report issued in EP 10181002.6, dated Dec. 23, 2014, European Patent Office, Munich, DE, 8 pages.
Extended European Search Report issued in EP 11173127.9, dated Dec. 23, 2014, European Patent Office, Munich, DE, 12 pages.
Extended European Search Report issued in EP 11173133.7, dated Dec. 23, 2014, European Patent Office, Munich, DE, 13 pages.
Extended European Search Report issued in EP 11173135.2, dated Dec. 23, 2014, European Patent Office, Munich, DE, 13 pages.
Extended European Search Report issued in EP 11173136.0, dated Dec. 23, 2014, European Patent Office, Munich, DE, 15 pages.
Extended European Search Report issued in EP 11173137.8, Dec. 23, 2014, European Patent Office, Munich, DE, 13 pages.
Extended European Search Report issued in EP 11173138.6, dated Dec. 23, 2014, European Patent Office, Munich, DE, 13 pages.
Extended European Search Report issued in EP 11173139.4, dated Dec. 23, 2014, European Patent Office, Munich, DE, 10 pages.
Extended European Search Report issued in EP 11173141.0, dated Jan. 7, 2015, European Patent Office, Munich, DE, 20 pages.
Extended European Search Report issued in EP 11173142.8, dated Jan. 7, 2015, European Patent Office, Munich, DE, 15 pages.
Extended European Search Report issued in EP 11173144.4, dated Jan. 7, 2015, European Patent Office, Munich, DE, 14 pages.
Extended European Search Report issued in EP 11173147.7, dated Jan. 7, 2015, European Patent Office, Munich, DE, 12 pages.
Extended European Search Report issued in EP 11173150.1, dated Jan. 7, 2015, European Patent Office, Munich, DE, 15 pages.
Extended European Search Report issued in 11173153.5, dated Jan. 7, 2015, European Patent Office, Munich DE, 13 pages.
Extended European Search Report issued in EP 11173155.0, dated Jan. 7, 2015, European Patent Office, Munich, DE, 18 pages.
Extended European Search Report issued in EP 11173157.6, dated Jan. 7, 2015, European Patent Office, Munich, DE, 15 pages.
Extended European Search Report issued in EP 1173158.4. dated Jan. 7, 2015, European Patent Office, Munich, DE, 10 pages.
Extended European Search Report issued in EP 11173156.8, dated Jan. 21, 2015, European Patent Office, Munich, DE, 10 pages.
Extended European Search Report issued in EP 10181186.7, dated Apr. 22, 2015, European Patent Office Munich, DE, 10 pages.
Extended European Search Report issued in EP 11173146.9, dated Apr. 22, 2015, European Patent Office, Munich, DE, 8 pages.
Extended European Search Report issued in EP 11173143.6, dated Apr. 22, 2015, European Patent Office, Munich, DE, 10 pages.
Extended European Search Report ssued in EP 11173154.3, dated Apr. 12, 2016, European Patent Office, Munich, DE, 10 pages.
Extended European Search Report issued in EP 11173151.9, dated Apr. 12, 2016, European Patent Office, Munich, DE, 14 pages.
Extended European Search Report issued in EP 11173149.3, dated Apr. 12, 2016, European Patent Office, Munich, DE, 11 pages.
Extended European Search Report issued in EP 11173140.2, dated Apr. 13, 2016, European Patent Office, Munich, DE, 8 pages.
Pervan, Darko, U.S. Appl. No. 15/603,913, entitled "Mechanical Locking System for Floor Panels," filed in the U.S. Patent and Trademark Office on May 24, 2017.
Pervan, Darko, et al., U.S. Appl. No. 15/896,571 entitled "Mechanical Locking of Floor Panels with a Flexible Tongue," filed in the U.S. Patent and Trademark Office on Feb. 14, 2018.
Pervan, Darko, U.S. Appl. No. 15/726,853 entitled "Mechanical Locking System for Panels and Method of Installing Same," filed in the U.S. Patent and Trademark Office Oct. 6, 2017.
Pervan, Darko, U.S. Appl. No. 15/813,855 entitled "Mechanical Locking of Floor Panels with a Glued Tongue," filed in the U.S. Patent and Trademark Office Nov. 15, 2017.
Pervan, Darko, et al., U.S. Appl. No. 15/855,389 entitled "Mechanical Locking System for Floor Panels." filed in the U.S. Patent and Trademark Office on Dec. 27, 2017.
Pervan, Darko, U.S. Appl. No. 16/143,610 entitled "Mechanical Locking System for Panels and Method of Installing Same," filed in the U.S. Patent and Trademark Office dated Sep. 27, 2018.
Pervan, Darko, U.S. Appl. No. 16/163,088 entitled "Mechanical Locking System for Floor Panels," filed in the U.S. Patent and Trademark Office dated Oct. 17, 2018.
Pervan, Darko, U.S. Appl. No. 16/224,951 entitled "Mechanical Locking System for Floor Panels," filed in the U.S. Patent and Trademark Office dated Dec. 19, 2018.

* cited by examiner

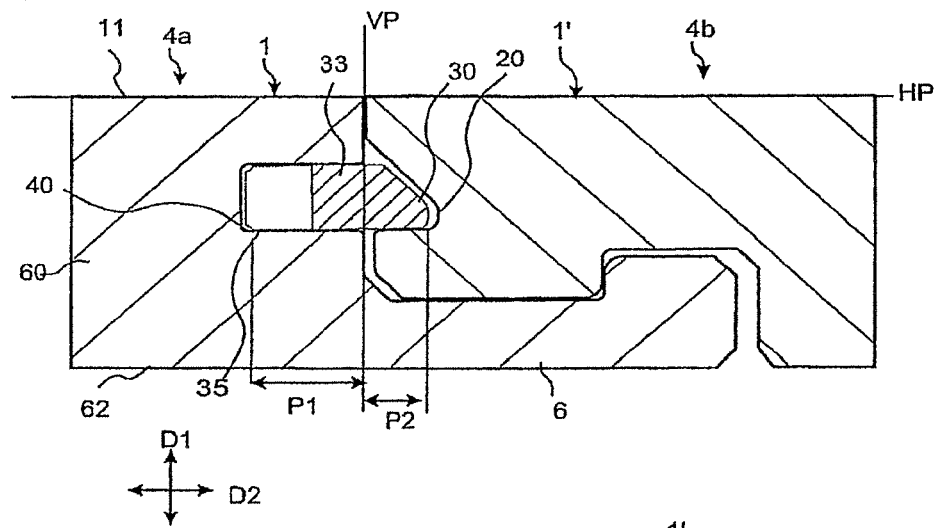
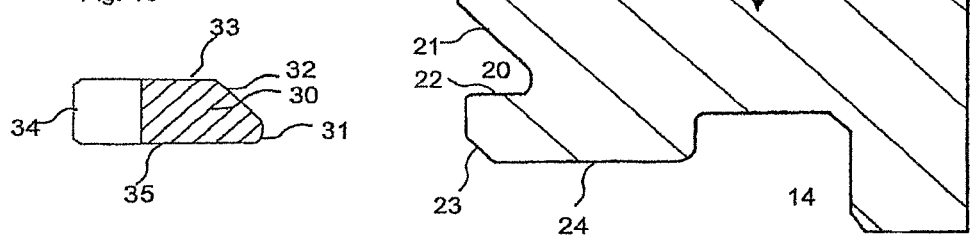
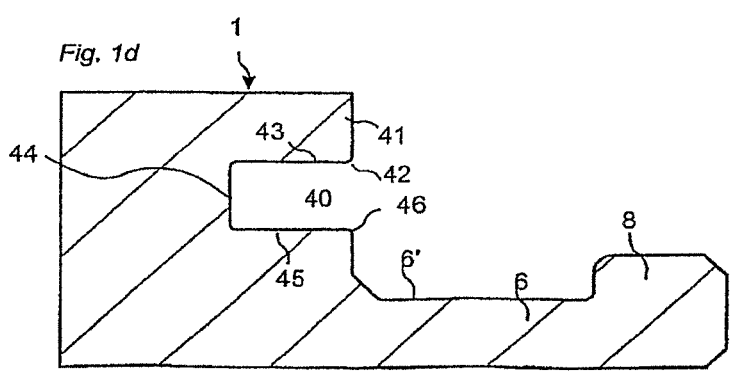

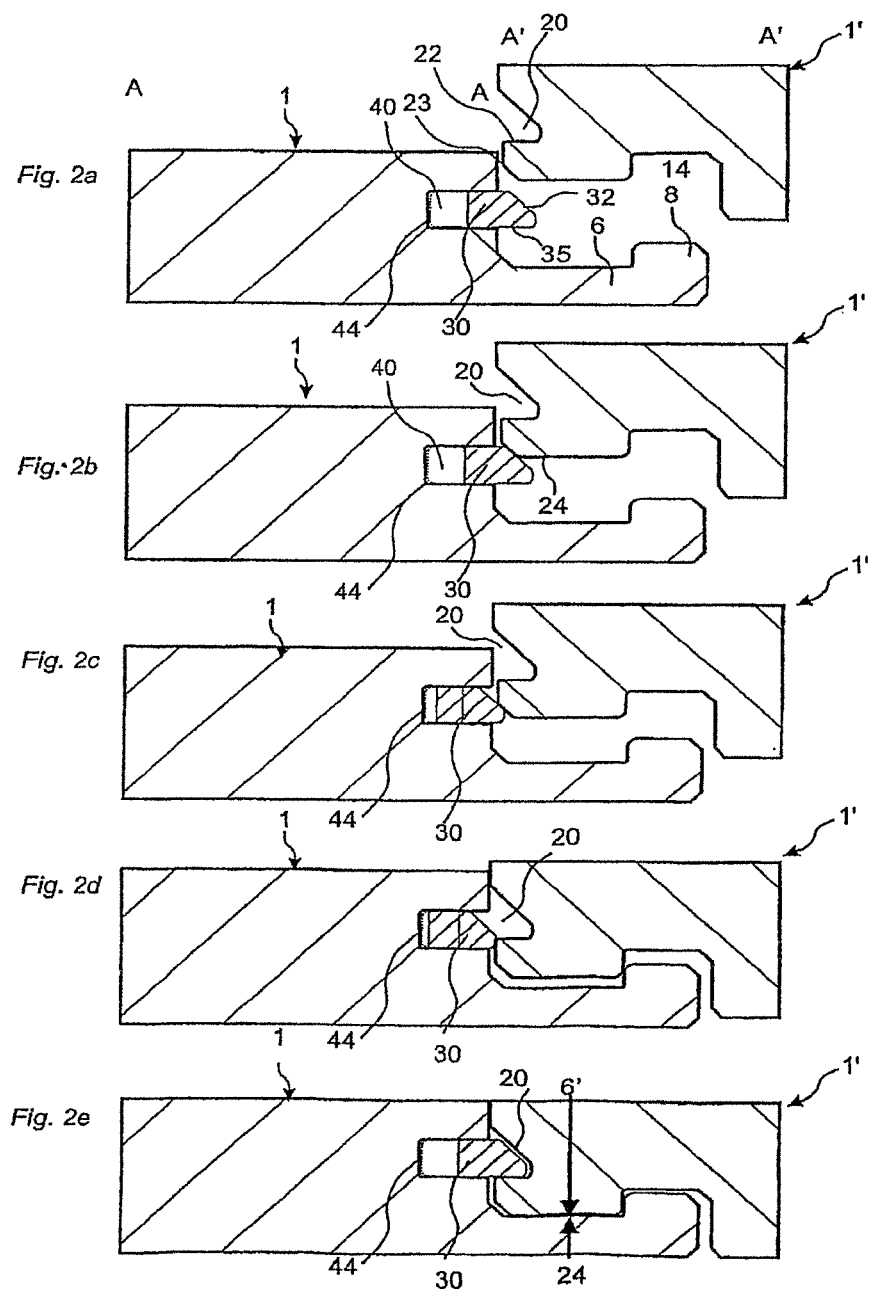

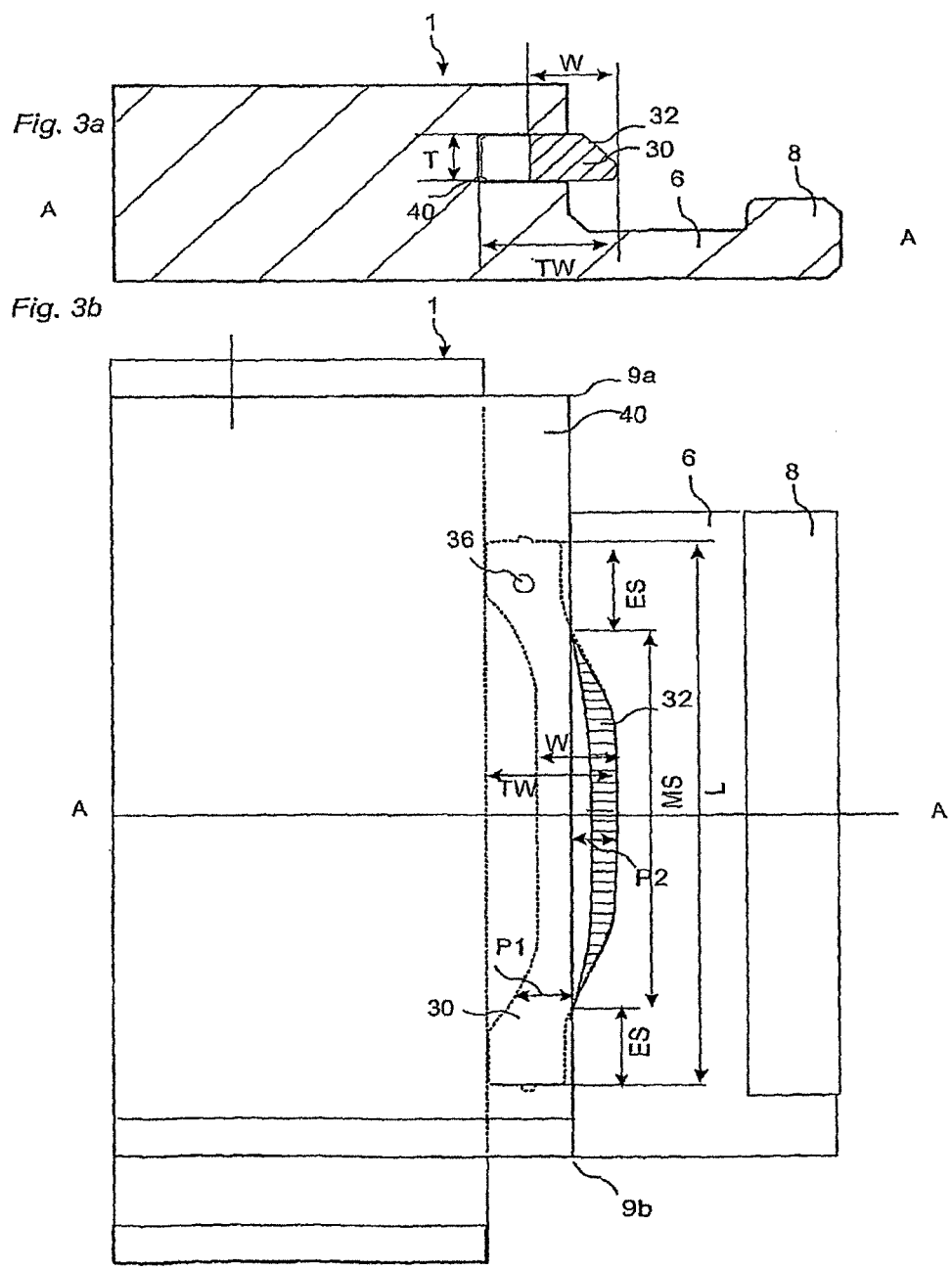

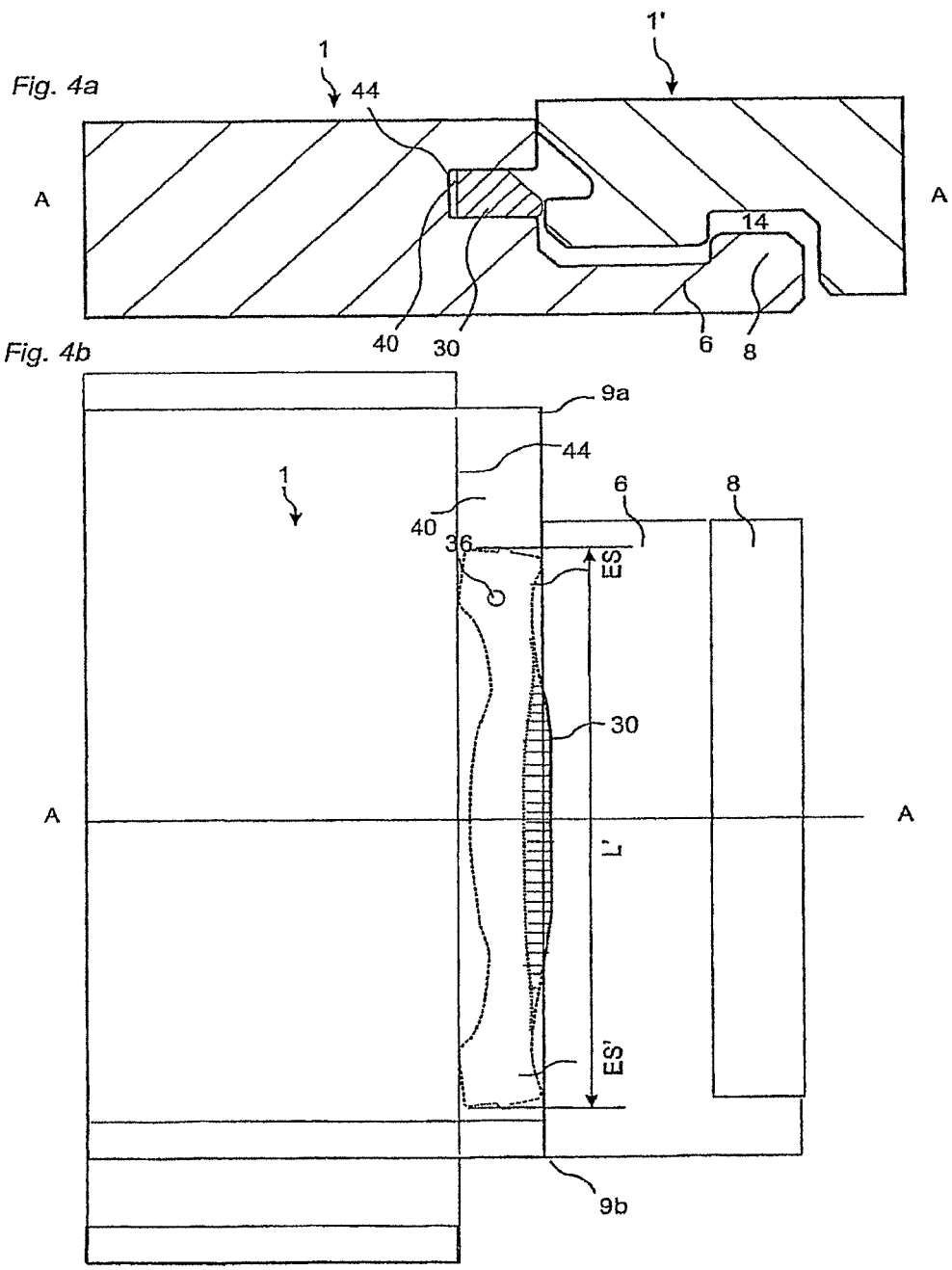

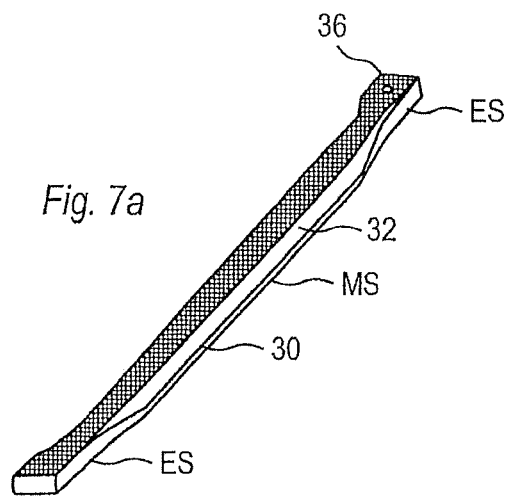
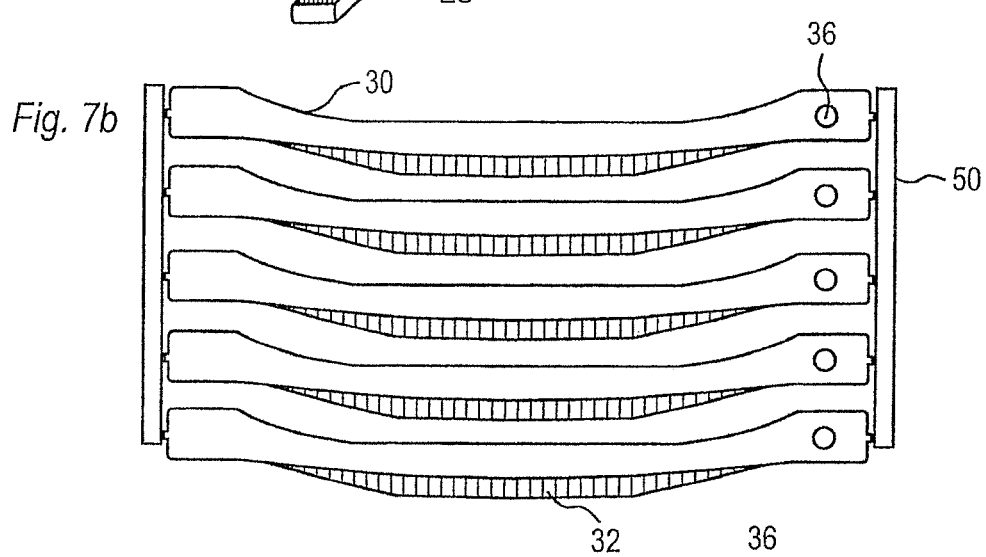
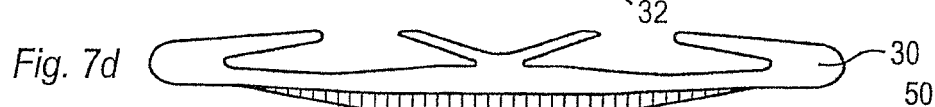
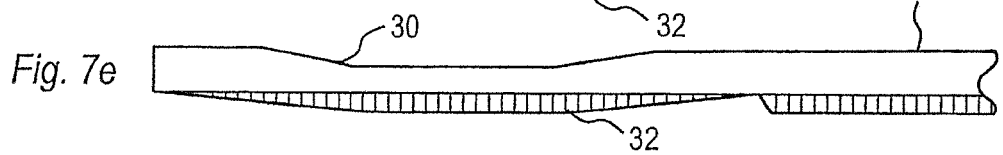
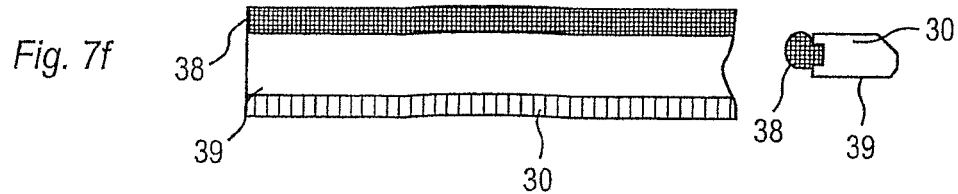

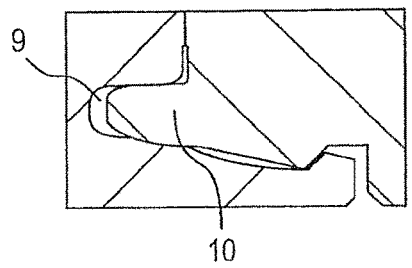
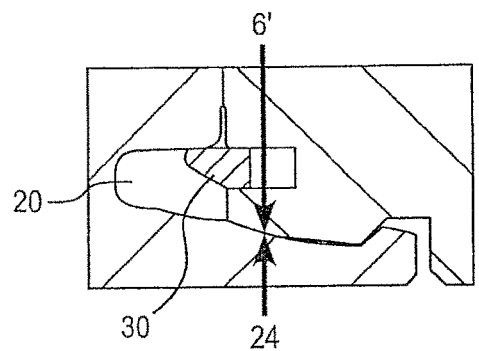
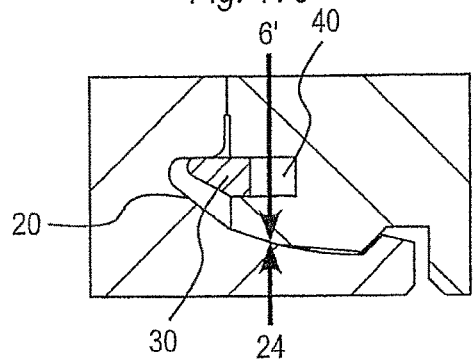
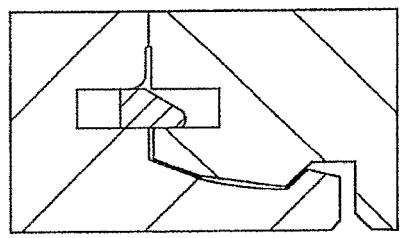
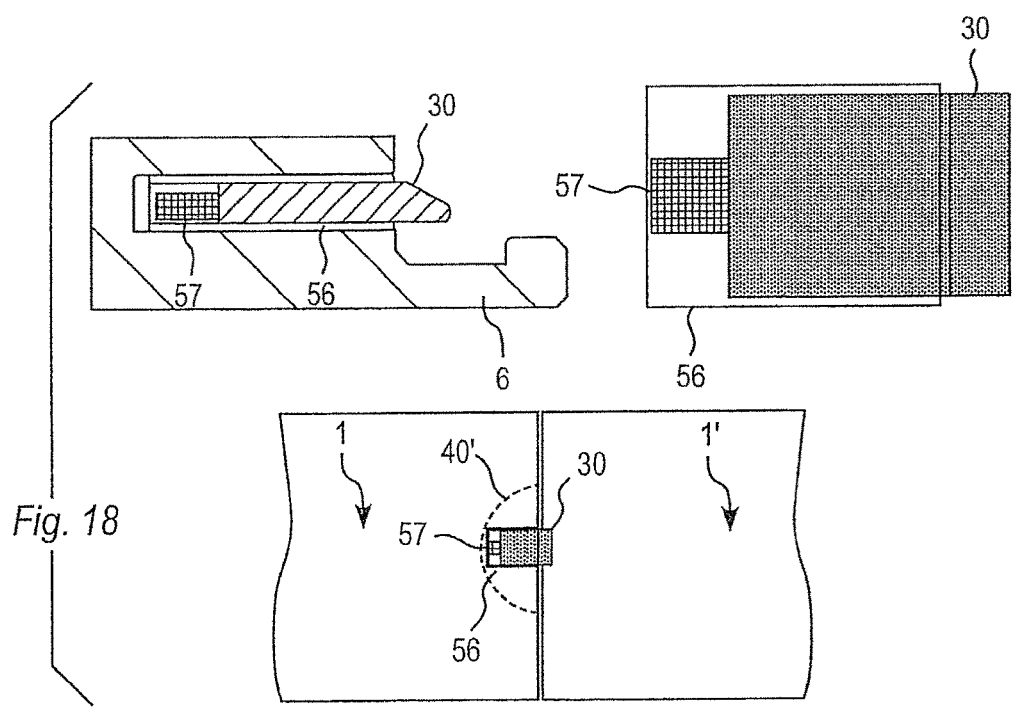

Fig. 18a
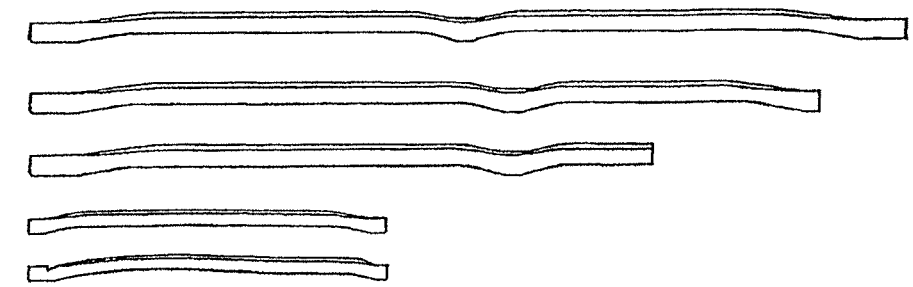
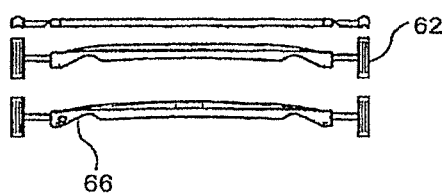
Fig. 18b
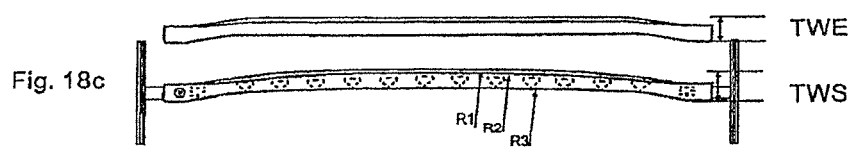
Fig. 18c
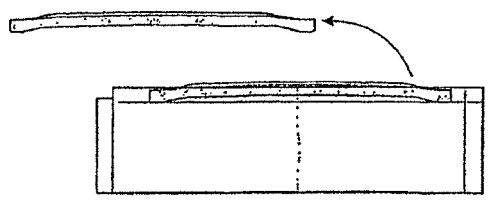
Fig. 18d

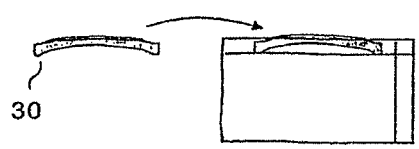
Fig. 18f

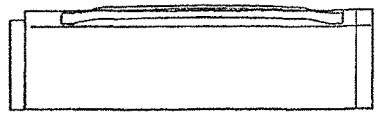
Fig. 20a
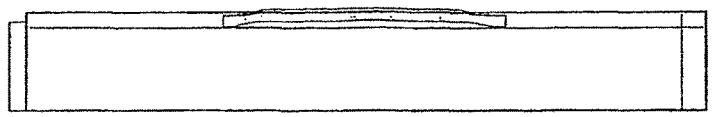
Fig. 20b
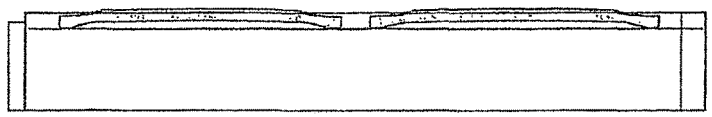
Fig. 20c
Fig. 20d
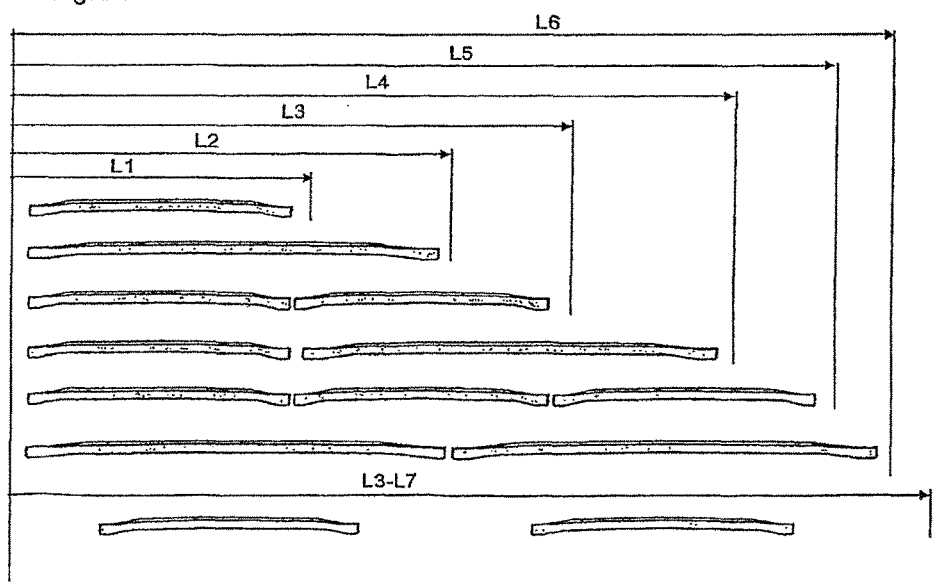

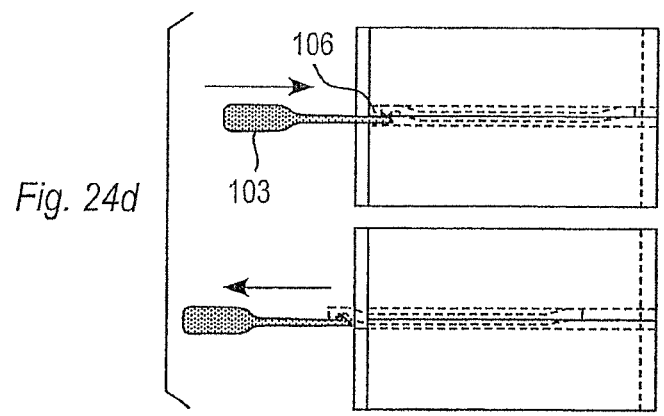
Fig. 24d
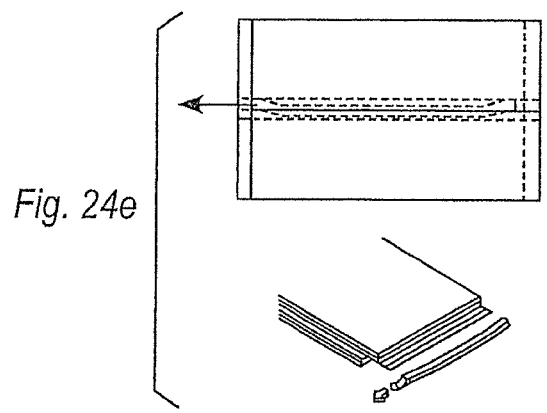
Fig. 24e
Fig. 24f
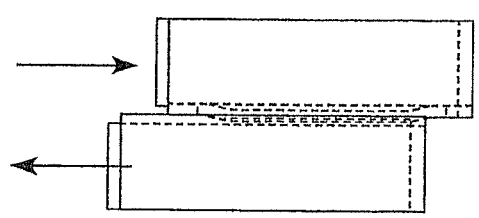
Fig. 24g
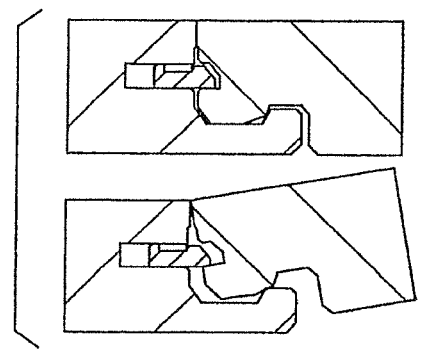

MECHANICAL LOCKING OF FLOOR PANELS WITH A FLEXIBLE TONGUE

CROSS REFERENCE TO RELATED APPLICATIONS

The present application is a continuation of U.S. application Ser. No. 13/670,039, filed on Nov. 6, 2012, which is a continuation of U.S. application Ser. No. 12/216,892, filed on Jul. 11, 2008, now U.S. Pat. No. 8,381,477, which is a continuation of U.S. application Ser. No. 11/575,600, filed on Dec. 7, 2007, now U.S. Pat. No. 8,341,915 which is a national stage application of International Application No. PCT/SE2005/001586, which claims priority to European Application No. 04025167.0, filed on Oct. 22, 2004. The entire contents of each of U.S. application Ser. No. 13/670,039, U.S. application Ser. No. 12/216,892, U.S. application Ser. No. 11/575,600, International Application No. PCT/SE2005/001586, and European Application No. 04025167.0 are hereby incorporated herein by reference.

TECHNICAL FIELD

The invention generally relates to the field of floor panels with mechanical locking systems and such building panels that are made of a board material. The invention relates to tongues for such locking systems and methods for providing and installing panels with such locking systems.

FIELD OF APPLICATION OF THE INVENTION

The present invention is particularly suitable for use in floating floors, which are formed of floor panels which are joined mechanically with a locking system integrated with the floor panel, i.e. mounted at the factory, are made up of one or more upper layers of veneer, decorative laminate or decorative plastic material, an intermediate core of wood-fibre-based material or plastic material and preferably a lower balancing layer on the rear side of the core. The following description of prior-art technique, problems of known systems and objects and features of the invention will therefore, as a non-restrictive example, be aimed above all at this field of application and in particular laminate flooring formed as rectangular floor panels with long and shorts sides intended to be mechanically joined on both long and short sides. The long and shorts sides are mainly used to simplify the description of the invention. The panels could be square, the sides could have an angle other than 90 degree and they could have more than 4 sides. It should be emphasized that the invention can be used in any floor panel and it could be combined with all types of known locking system, on an adjacent side of the same panel, where the floor panels are intended to be joined using a mechanical locking system in the horizontal and vertical directions. The invention can thus also be applicable to, for instance, solid wooden floors, parquet floors with a core of wood or wood-fibre-based material and a surface of wood or wood veneer and the like, floors with a printed and preferably also varnished surface, floors with a surface layer of plastic or cork, linoleum, rubber. Even floors with hard surfaces and or core materials such as stone, tile, glass and similar are included as well as floorings with soft wear layer, for instance needle felt glued to a board. With diamond tools it is possible to form one piece angling system on for instance a long side of a hard material, such as marble, ceramics, glass or similar materials. In a similar way locking system could also be formed in solid metal plates and other types of non-flexible composite boards, all such embodiments could have a flex tongue on long or short side, according to the basic principle of the invention. The invention can also be used for joining building panels which preferably contain a board material for instance wall panels, ceilings, furniture components and similar.

BACKGROUND OF THE INVENTION

Laminate flooring usually consists of a core of a 6-12 mm fibre board, a 0.2-0.8 mm thick upper decorative surface layer of laminate and a 0.1-0.6 mm thick lower balancing layer of laminate, plastic, paper or like material. The surface layer provides appearance and durability to the floor panels. The core provides stability, and the balancing layer keeps the panel plane when the relative humidity (RH) varies during the year. The floor panels are laid floating, i.e. without gluing, on an existing sub floor. Laminate flooring and also many other types of flooring are made by the surface layer and the balancing layer being applied to a core material. This application may take place by gluing a previously manufactured decorative layer, for instance when the fibre board is provided with a decorative high pressure laminate which is made in a separate operation where a plurality of impregnated sheets of paper are compressed under high pressure and at a high temperature. The currently most common method when making laminate flooring, however, is direct laminating which is based on a more modern principle where both manufacture of the decorative laminate layer and the bonding to the fibre board take place in one and the same manufacturing step. Impregnated sheets of paper are applied directly to the panel and pressed together under pressure and heat without any gluing.

Traditional hard floor panels in floating flooring of this type are usually joined by means of glued tongue-and-groove joints.

In addition to such traditional floors, which are joined by means of glued tongue-and-groove joints, floor panels have recently been developed which do not require the use of glue and instead are joined mechanically by means of so-called mechanical locking systems. These systems comprise locking means, which lock the panels horizontally and vertically. The mechanical locking systems are usually formed by machining of the core of the panel. Alternatively, parts of the locking system can be formed of a separate material, for instance aluminium or HDF, which is integrated with the floor panel, i.e. joined with the floor panel in connection with the manufacture thereof.

The main advantages of floating floors with mechanical locking systems are that they can easily and quickly be laid by various combinations of inward angling, snapping-in and insertion. They can also easily be taken up again and used once more at a different location. A further advantage of the mechanical locking systems is that the joint edges of the floor panels can be made of materials, which need not to have good gluing properties. The most common core material is fibreboard with high density and good stability usually called HDF—High Density Fibreboard. Sometimes also MDF—Medium Density Fibreboard—is used as core.

Definition of Some Terms

In the following text, the visible surface of the installed floor panel is called "front side", while the opposite side of the floor panel, facing the sub floor, is called "rear side". The edge between the front and rear side is called "joint edge". By "horizontal plane" is meant a plane, which extends parallel to the outer part of the surface layer. Immediately juxtaposed upper parts of two adjacent joint edges of two joined floor panels together define a "vertical plane" perpendicular to the horizontal plane.

By "joint" or "locking system" are meant co acting connecting means, which connect the floor panels vertically and/or horizontally. By "mechanical locking system" is meant that joining can take place without glue. Mechanical locking systems can in many cases also be combined with gluing. By "integrated with" means formed in one piece with the panel or factory connected to the panel.

By a "flexible tongue" is meant a separate tongue which has a length direction along the joint edges and which is forming a part of the vertical locking system and could be displaced horizontally during locking. The tongue could be for example flexible and resilient in such a way that it can bend along its length and spring back to its initial position.

By "flexible tongue blank" are meant two or more flexible tongues, which are connected to a one-piece component. Examples of such flexible tongue blanks will be described in more detail below.

By "fixing the flexible tongue" is meant that the flexible tongue should at least be sufficiently attached to the floor panel so as not to incidentally fall off during handling of the floor panel, at the factory, during transport and/or in installation. By "mechanically fixed" is meant that the fixing is essentially due to shape or friction force.

By "angling" is meant a connection that occurs by a turning motion, during which an angular change occurs between two parts that are being connected, or disconnected. When angling relates to connection of two floor panels, the angular motion takes place with the upper parts of joint edges at least partly being in contact with each other, during at least part of the motion.

By "vertical folding" is meant a connection of three panels where a first and second panel are in a connected state and where an angling action connects two perpendicular edges of a new panel to the first and second panel. Such a connection takes place for example when a long side of first panel in a first row is already connected to a long side of a second panel in a second row. The third panel is than connected by angling to the long side of the first panel in the first row. This specific type of angling action, which also connects the short side of the new panel and second panel, is referred to as vertical folding

PRIOR-ART TECHNIQUE AND PROBLEMS THEREOF

For mechanical joining of long sides as well as short sides in the vertical and horizontal direction (direction D1, D2) several methods are used but the locking is always performed in 3 steps where angling or snapping are combined with displacement along the joint edge in the locked position after an optional side has been joined.
  Angling of long side, displacement and snapping-in of short side
  Snapping-in of long side, displacement and snapping-in of short side.
  Angling of short side, displacement of the new panel along the short side edge of the previous panel and finally downward angling of two panels.
These laying methods can also be combined with insertion along the joint edge.

It is known that the locking system may, however, be formed so that snapping-in may occur by a motion which is vertical to the surface of the floor panel. Generally, the long side is locked by angling and the short side with a vertical angling which locks with a snap action. Such a system in described in WO 01/0248127 (Akzenta). The connection of panels is complicated and difficult since fibres must be compressed and a hammer with a tapping block must be used. The panels are locked in vertical direction mainly by a friction force and the locking strength is low.

It is known that floor panels may be locked on long and short side vertically and horizontally with one simple vertical folding action (WO 03/083234 Applicant Välinge Aluminium). This document comprises a part of this application. The object of WO 03/083234 is to provide a joint system and floor panels which can be laid with a vertical folding.

A floor panel with a vertical joint in the form of a flexible tongue and a groove is provided, the tongue being made of a separate material and being flexible so that at least one of the sides of the floor panel can be joined by a vertical motion parallel to the vertical plane.

This document also show how a joint system can be made with a flexible spring tongue which can be displaced and/or compressed horizontally in and out or alternatively be bent vertically up or down. It describes a separate tongue of, for instance, wood fibre material, which can be displaced horizontally by means of a flexible material, for instance a rubber paste. It also describes an embodiment with a tongue, which has an inner part that is resilient.

This known technology with a tongue, which during locking moves horizontally in relation to the adjacent edges, offers several advantages over the known installation methods. The locking is easy and faster since 3 steps are reduced to one step.

The invention described in WO 03/083234 does not however show the best mode of locking floor panels with a vertical folding. The production cost and the locking function could be improved considerably.

BRIEF DESCRIPTION OF THE INVENTION AND OBJECTS THEREOF

A first overall objective of the present invention is to provide a locking system based on a vertical folding with a flexible tongue fixed in a tongue groove. The locking system should make it possible to lock all four sides of one panel vertically and horizontally to other panels with angling action only. The costs and functions should be favourable compared to the known technology. An essential part of the overall objective is to improve the function and costs of those parts of the locking system that causes the flexible tongue to displace during locking and spring back in locked position.

More specifically the object is to provide a vertical folding locking system with a flexible tongue where one or several of the following advantages are obtained.

The flexible tongue should preferably be possible to displace during locking with such a low force that no tools will be needed in connection with installation.

The spring effect should be reliable and the flexible tongue should move back, partly or completely, to a predetermined position when the panels have been brought to the position where they are to be locked.

The vertical locking should be strong and prevent that two locked panels will move vertically when humidity is changing or when people walk on a floor.

The locking system should be able to lock floor panels vertically with high precision so that the surfaces are essentially in the same plane.

The vertical locking system should be designed in such a way that the material and production costs could be low.

The separate flexible tongue should be possible to fix to the floor panel in a simple and cost effective way. The fixing should keep the flexible tongue at least fixed to the panel during production, transport and installation.

A second objective is to provide methods to produce the flexible tongue and flexible tongue blanks which are later to constitute parts of the mechanical locking system of the floor panels.

A third object is to provide a rational method for fixing the flexible tongues with the joint portion of the floor panel to form an integrated mechanical locking system where the flexible tongue is factory fixed to the floor panel.

A fourth object is to provide installation methods to connect floor panels with vertical folding.

A fifth object is to provide a tool and a method to take up the floor panels.

The above objects of the invention are achieved wholly or partly by a locking system, floor panels, a flexible tongue, a flexible tongue blank and production and installation methods according to the independent claims. Embodiments of the invention are evident from the dependent claims and from the description and drawings.

Although it is an advantage to integrate the flexible tongue with the panel in the factory before installation, the invention does not exclude an embodiment in which flexible tongues are delivered as separate components to be fixed to the panel by the installer prior to installation, the invention does not exclude glue, sealing compounds, wax or other similar chemicals in the locking system.

According to a first aspect of the invention, a new floor panel comprising connecting means, which are integrated with the floor panel and adapted to connect the new floor panel with an essentially identical first and second floor panel is provided.

The upper joint edges of said new and second floor panels define in the connected state a vertical plane.

The connecting means are designed to connect said new floor panel with said second floor panel in a horizontal direction perpendicular to said vertical plane and in a vertical direction parallel to the vertical plane. The vertical connection comprising a flexible tongue in a displacement groove, in one of the new or the second floor panels. The displacement groove is formed in the edge of the panel and is open towards the vertical plane. The flexible tongue has a length direction along the joint edges, a width in the horizontal plane perpendicular to the length and a thickness in the vertical direction.

The flexible tongue is designed to cooperate, in said connected state with a tongue groove of another one of the new or second floor panels.

The horizontal connection comprising a locking strip which projects from said vertical plane and carries a locking element 8 in the second panel.

The locking strip 6 is designed to cooperate, in said connected state, with a downward open locking groove of the new floor panel. The new floor panel could be locked to the first and second floor panel with vertical folding. The flexible tongue is during the vertical folding displaced two times in the displacement groove. The first displacement is effected by the vertical folding of the new floor panel whereby at least a part of the flexible tongue is bent in the length direction and parallel with the width.

A second displacement of the flexible tongue towards its initial position is accomplished substantially by a spring effect caused by said bending of said flexible tongue.

According to a first aspect of the second objective a tongue blank is provided consisting of several flexible tongues connected to each other. This facilitated automatic handling of the tongues in connection with the fixing of the flexible tongues into the displacement groove. In an alternative embodiment, separate tongues are produced, which are preferably moved by means of vibration to a predetermined positioned, where the tongue is displaced into and fixed in the displacement groove According to a first aspect of the third objective a production method is provided to fix the flexible tongue in the displacement groove. The flexible tongue is separated from a tongue blank and displaced essentially parallel to its width or length into the displacement groove where it is fixed with a friction force.

According to a first aspect of the fourth objective installation methods are provided which make it possible to connect floor panels vertically and horizontally long side to short side with a simple angling motion.

According to a second aspect, there is provided a floor panel having an edge portion presenting a sidewardly open groove, in which a tongue formed as a separate part is received. The tongue is bendable in a plane substantially parallel with a main plane of the floor panel, such that the tongue is resiliently displaceable in said plane.

According to a third aspect, there is provided a tongue adapted for being received in a sidewardly open groove of a floor panel. The tongue, when received in the groove, is bendable in a plane substantially parallel with a main plane of the floor panel, such that the tongue is at least partially resiliently displaceable in said plane.

According to a first aspect of the fifth objective a reinstallation tool to take up installed floor panels with a flexible tongue is provide. The tool is inserted into a tongue groove or a displacement groove of an installed panel and the tongue is pulled or pushed out of the tongue groove.

According to a second aspect of the fifth objective methods to take up installed floor panels with a flexible tongue are provided. One method comprising removing of a tongue from a first edge of an installed floor panel, preferably using the reinstallation tool, and preferably angle up the floor panel along a second edge. One advantage is that last installed floor panel in one row could be angle up, while the other floor panels in the same row are laying flat on the subfloor in a connected state to a previously installed row. This method to take up a floor panel reduces considerably the risk of damaging the locking system, especially if the floorboards are thick and heavy or installed a tight fit. Further methods is to use the conventional methods adopted to taking up floorpanels with a conventional non flexible tongue, e.g. angling-angling, angling-sliding, snapping-sliding or snapping-angling. In such traditional methods, generally the whole row has to be angled up.

The invention allows horizontal and vertical locking of all sides of floor panels with a simple angling of the long sides only. Therefore it is especially suited for use in floor panels which are difficult to displace in locked position for example because they are long, in panels where parts of the locking system is made of a material with high friction, such as wood and in locking systems which are produced with tight fit, without play or even with pretension. Especially panels with such pretension where the locking strip is bent in locked position and presses the panels together are very difficult to displace. A locking system that allows a vertical folding according to the invention will decrease the installation time of such panels considerably.

The invention is also especially well-suited for panels which are connected long side to short side and for panels which are wide for example with a width larger than 20 cm. Such panels are difficult to snap on short side and in most materials they must have a vertical locking to avoid height differences between the joint surfaces. The invention could preferably be combined with bevels or similar edge configurations on short and/or long sides. In such a floor, a simple and low cost embodiment of the flexible tongue, could be used, since height differences of adjacent edges preferably short side edges, will be less visible.

BRIEF DESCRIPTION OF THE DRAWINGS

FIGS. 1a-1d show floor panels with a mechanical locking system according to one embodiment.

FIGS. 2a-2e show how a fold panel could be locked to strip panel.

FIGS. 3a-3b show floor panels with a mechanical locking system on a short side.

FIGS. 4a-4b show the flexible tongue during the locking action.

FIGS. 7a-7f show different embodiments of a flexible tongue.

FIGS. 17a-17d show how widely used traditional panels could be adjusted to vertical folding.

FIG. 18 shows the flexible tongue in another embodiment according to the invention.

FIGS. 18a-18c show the flexible tongue in another embodiment according to the invention.

FIGS. 18d-18f show embodiments for a split floor panel.

FIGS. 20a-20d show embodiments with different lengths and numbers of the flex tongue

FIGS. 24a-24g show different embodiments of a dismounting tool and dismounting methods.

DESCRIPTION OF EMBODIMENTS OF THE INVENTION

Figure 5A:
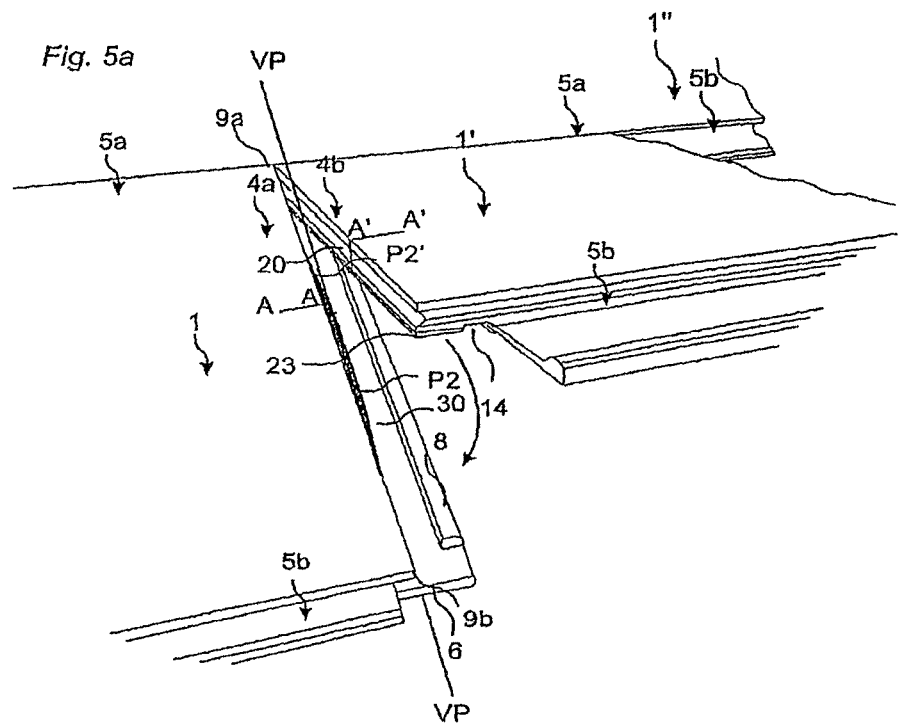
FIGS. 5a-5b show how short sides of two floor panels could be locked with vertical folding.

A first preferred embodiment of a floor panel 1, 1' provided with a mechanical locking system according to the invention is now described with reference to FIGS. 1a-1d. To facilitate understanding, the locking systems in all figures are shown schematically. It should be emphasized that improved or different functions can be achieved using combinations of the preferred embodiments. The inventor has tested all known and especially all commercially used locking systems on the market in all type of floor panels, especially laminate and wood floorings and the conclusion is that at least all these known locking systems which have one or more tongues could be adjusted to a system with one or more flexible tongues according to the invention. Most of them could easily be adjusted in such a way that they will be compatible with the present systems. Several flexible tongues could be located in both adjacent edges, one over the other and they could be on different levels in the same edge or installed in the same groove after each other. The flexible tongue could be on long and/or short sides and one long or short side could be combined with a flexible tongue on another long or short side, which could have all known locking systems, preferably locking systems which could be locked by angling or a vertical movement. The invention does not exclude floor panels with flexible tongues on for example a long and a short side. Such panels could be installed by a vertical motion without any angling. Angles, dimensions, rounded parts etc. are only examples and could be adjusted within the principles of the invention.

A first preferred embodiment of a floor panel 1, 1' provided with a mechanical locking system according to the invention is now described with reference to FIGS. 1a-1d.

FIG. 1a illustrates schematically a cross-section of a joint between a short side joint edge 4a of a panel 1 and an opposite short side joint edge 4b of a second panel 1'.

The front sides 61 of the panels are essentially positioned in a common horizontal plane HP, and the upper parts 21, 41 of the joint edges 4a, 4b abut against each other in a vertical plane VP. The mechanical locking system provides locking of the panels relative to each other in the vertical direction D1 as well as the horizontal direction D2.

To provide joining of the two joint edges in the D1 and D2 directions, the edges of the floor panel have in a manner known per se a locking strip 6 with a locking element 8 in one joint edge, hereafter referred to as the "strip panel" which cooperates with a locking groove 14 in the other joint edge, hereafter referred to as the "fold panel", and provides the horizontal locking.

The mechanical locking system according to the invention comprises a separate flexible tongue 30 fixed into a displacement groove 40 formed in one of the joint edges. The flexible tongue 30 has a groove portion P1, which is located in the displacement groove 40 and a projecting portion P2 projecting outside the displacement groove 40. The projecting portion P2 of the flexible tongue 30 in one of the joint edges cooperates with a tongue groove formed in the other joint edge.

In this embodiment, the panel 1 could for example have a body or core 60 of wood-fibre-based material such as HDF, plywood or solid wood.

The flexible tongue 30 has a protruding part P2 with a rounded outer part 31 and a sliding surface 32, which in this embodiment if formed like a bevel. It has upper 33 and lower 35 tongue displacement surfaces and an inner part 34.

The displacement groove 40 has an upper 42 and a lower 46 opening, which in this embodiment are rounded, a bottom 44 and upper 43 and lower 45 groove displacement surfaces, which preferably are essentially parallel with the horizontal plane HP.

The tongue groove 20 has a tongue-locking surface 22, which cooperates with the flexible tongue 30 and locks the joint edges in a vertical direction D1. The fold panel 1' has a vertical locking surface 24, which is closer to the rear side 62 than the tongue groove 20. The vertical locking surface 24 cooperates with the strip 6 and locks the joint edges in another vertical direction. The fold panel has in this embodiment a sliding surface 23 which cooperated during locking with the sliding surface 32 of the tongue. Preferably there are spaces of 0.1 mm or more between all surfaces, which are not active in the vertical or horizontal locking as shown in FIG. 1, especially between inner and upper part of the tongue groove 20 and the flexible tongue 30.

FIGS. 2a-2e shows how a fold panel 1' could be locked to a strip panel 1. The figures show a vertical motion of two panels towards each other. The figures also shows a part of a vertical folding connecting three panels to each other as shown in FIG. 5a. The FIGS. 2a-2e shows how the two cross sections A-A and A'-A' of FIG. 5a will be connected when the fold panel 1' will be angled towards the strip panel 1. FIGS. 2b-2c show how the sliding surfaces cooperate when the folding panel 1' is moved vertically towards the strip panel 1. The flexible tongue 30 is displaced with a first displacement essentially horizontally in the displacement groove 40 towards the bottom 44. When the panels are in the position where they are to be locked to each other, the flexible tongue 30 springs back with a second displacement towards its initial position and the panels are locked vertically between the vertical locking surface 24 and the strip 6 and the lower displacement surface 35 and the tongue locking surface 22.

The flexible tongue 30 should preferably be fixed to the displacement groove 40 with high precision. Depending on the compressibility and friction between the flexible tongue 30 and the displacement groove 40, the tongue as whole or different parts could be fixed with a small play, for example 0.01-0.10 mm, a precise fit or a pre tension. Wax or other friction reducing materials or chemicals could be applied between the flexible tongue and the displacement groove and/or in the tongue groove and/or in the locking system in order to facilitate displacement of the tongue and the locking and/or to facilitate the fixing of the flexible tongue in the displacement groove.

Even with a play, a precise fit between the upper joint edges could be accomplished. The lower tongue displacement surface 35 could be formed to press the tongue locking surface 22 and the vertical locking surface 24 towards the strip 6. For example the protruding part P2 of the tongue displacement surface 35 could be formed with a small angle to the horizontal plane HP. The protruding part P2 of the flexible tongue will tilt towards the front side 61 and a part of the upper tongue displacement surface 33 will press against the upper groove displacement surface 43 while parts of lower displacement surfaces 35,45 close to the bottom 44 of the displacement groove 40 will press against each other. In such an embodiment, the vertical fit between the upper joint edges will mainly depend on the production tolerances between the vertical locking surfaces 24 and a vertical contact surface 6', in this embodiment located on the upper part of the strip 6, which in locked position, will be in contact with each other and preferably press against each other. The flexible tongue 30 could be formed to cause a permanent pressure force horizontally in the locked position. This means that the flexible tongue 30 will only partly spring back to the initial position. The flexible tongue 30 could optionally be designed with such dimensions that in locked position it will move slightly towards its initial position when people walk on the floor or when the panels at warping in different humidity. Gradually a perfect vertical connection will be accomplished.

FIG. 3a shows a cross section A-A of a panel according to FIG. 3b seen from above. The flexible tongue 30 has a length L along the joint edge, a width W parallel to the horizontal plane and perpendicular to the length L and a thickness T in the vertical direction D1. The sum of the largest groove portion P1 and the largest protruding part P2 is the total width TW. The flexible tongue has also in this embodiment a middle section MS and two edge sections ES adjacent to the middle section. The size of the protruding part P2 and the groove portion P1 varies in this embodiment along the length L and the tongue is spaced from the two corner sections 9a and 9b. This shape is favourable in order to facilitate the first and the second displacement of the flexible tongue 30.

FIGS. 4a and 4b show the position of the flexible tongue 30 after the first displacement towards the bottom 44 of the displacement groove 40. The displacement is caused essentially by bending of parts of the flexible tongue 30 in its length direction L parallel to the width W. This feature is essential for this embodiment of the invention and offers several advantages A first important advantage is that the tongue could be made of rather rigid material, which is strong and stable in the vertical direction while at the same time flexible in the horizontal direction D2 is possible to accomplish. The bending portions could be made considerably larger than the horizontal displacement needed to accomplish the locking.

A second advantage is that the parts, which are flexible and facilitates the first and second horizontal displacement also supports the vertical stability of the tongue. The advantage is that the total width TW of the flexible tongue and the depth of the displacement groove could be rather limited. This improves the strength and moisture deformation of the joint edge. As a non-restrictive example it could be mentioned that the total width TW of the flexible tongue could be about 5-15 mm A third advantage is that the flexible tongue could be made in one piece of a single material without any soft and compressible materials. This will decrease the production cost and facilitate the fixing of the tongue in the displacement groove.

The sliding grove is in this preferred embodiment a continuous groove over the whole length of the join edge. The displacement groove (40) could however be formed in only a part of the edge and it does not have to be parallel with the edge. The displacement groove (40) could for instance be curved. Such a groove is easy to produce with a rotating tool, which could move against the edge.

The fold panel could be disconnected with a needle shaped tool, which could be inserted from the corner section 9b into the tongue grove 20 and press the flexible tongue back into the displacement groove 40. The fold panel could then be angled up while the strip panel is still on the sub floor. Of course the panels could also be disconnected in the traditional way.

Figure 5B:
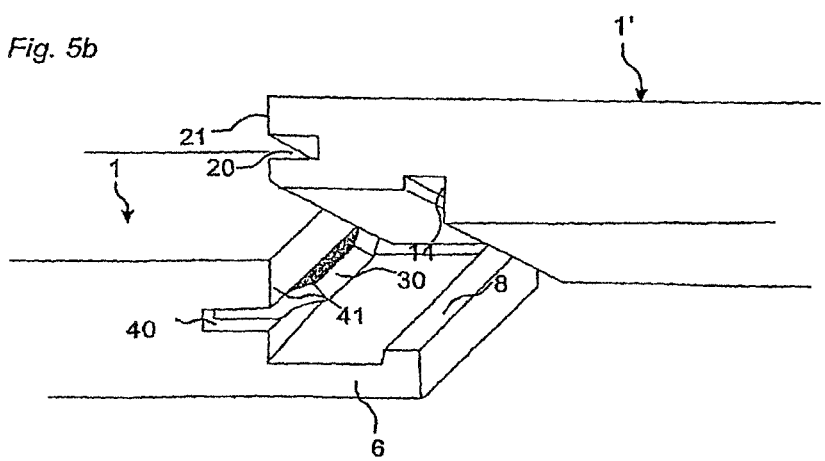
Figure 6A:
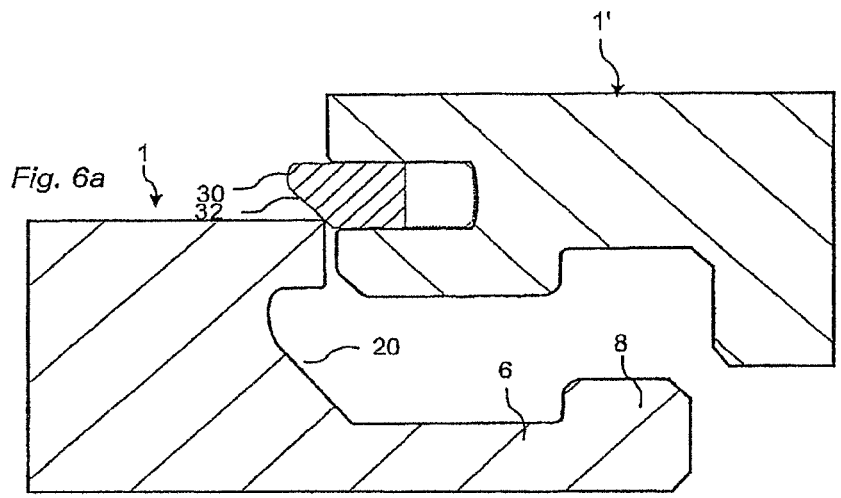
FIGS. 6a-6c show another embodiment of the invention.
Figure 6B:
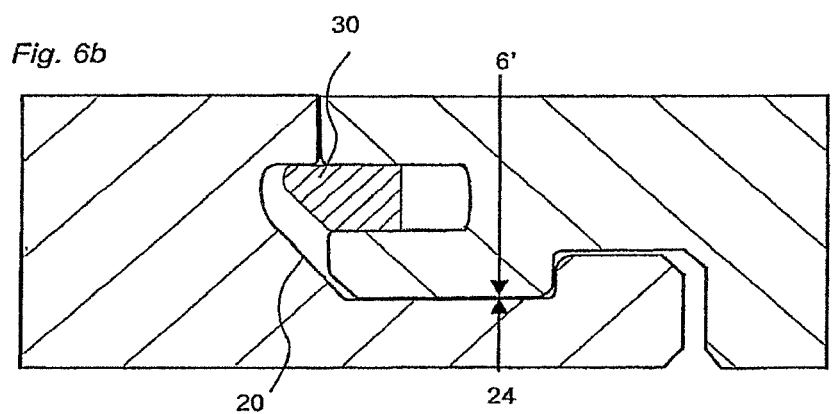

FIGS. 5a and 5b show one embodiment of a vertical folding. A first panel 1" in a first row is connected to a second 1 panel in a second row. The new panel 1' is connected with its long side 5a to the long side 5b of the first panel with angling. This angling action also connects the short side 4b of the new pane with the short side 4a of the second panel. The fold panel 1' is locked to the strip panel 1 with a combined vertical and turning motion along the vertical plane VP. The protruding part P2 has a rounded and or angled folding part P2' which during folding cooperates with the sliding surface 23 of the folding panel 1'. The combined effect of a folding part P2', and a sliding surface 32 of the tongue which during the folding cooperates with the sliding surface 23 of the fold panel 1' facilitates considerably the first displacement of the flexible tongue 30. The horizontal pressing force could be spread over a much larger portion than the thickness T of the flexible tongue and the fold panel could easily be folded down with a low force even if the spring effect of the bending is high. As a non-restrictive example it could be mentioned that a vertical pressing force of 10 N against a piece, which has a length of 100 mm along the long side, applied on the long side 5b of the fold panel, as shown in FIG. 5a, could displace a projecting portion P2 to the inner position even if the spring force is 20 N. Most of the pressure force will be horizontal and the flexible tongue will be displaced into the displacement groove 40 without any risk of a block effect caused by friction or a tilting and/or vertically bending of the flexible tongue 30. It is an advantage if the locking system is designed in such a way that the locking element 8 is partly in the locking groove 14 when the first displacement starts. This is shown in FIG. 5b. The top edges 41,21 are partly in contact with each other and the fold panel 1' is in the correct starting position. The locking element 8 and the locking groove 14 prevent the strip panel 1 and the fold panel 1' to separate when the flexible tongue 30 is pressed into the displacement groove 40. En essential feature of this embodiment is the position of the projecting portion P2, which is spaced from the corner section 9a and 9b. The spacing should be preferably at least 10% of the length of the joint edge, in this case the visible short side 4a. FIG. 5a shows that the spacing from the both corner section 9a and 9b gives the flexibility that the fold panel could during the vertical folding be connected to the long side of the first panel 1" with the tongue side 5a or the strip side 5b FIG. 6a-6b show that the flexible tongue could be in the edge of the fold panel 1'. The sliding surface 32 of the tongue cooperates in this embodiment with the top edge of the strip panel. Thanks to the folding part P2', the locking could be made without any risk of damaging the top surface layer at the edge. The advantage of this embodiment is that a short side with a flexible tongue could be connected to a traditional long side or short side locking system with a strip 6 and a tongue groove 20 in the same edge.

Figure 6C:
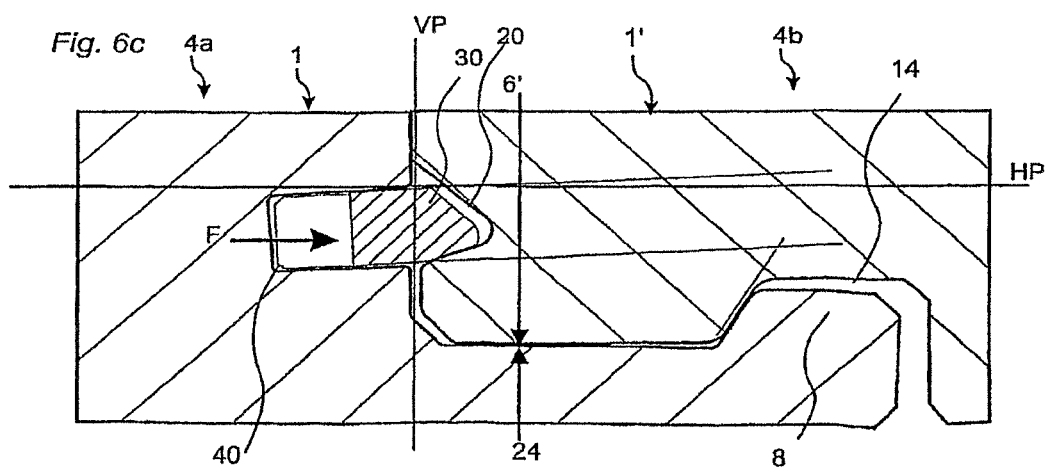
Figure 8A:
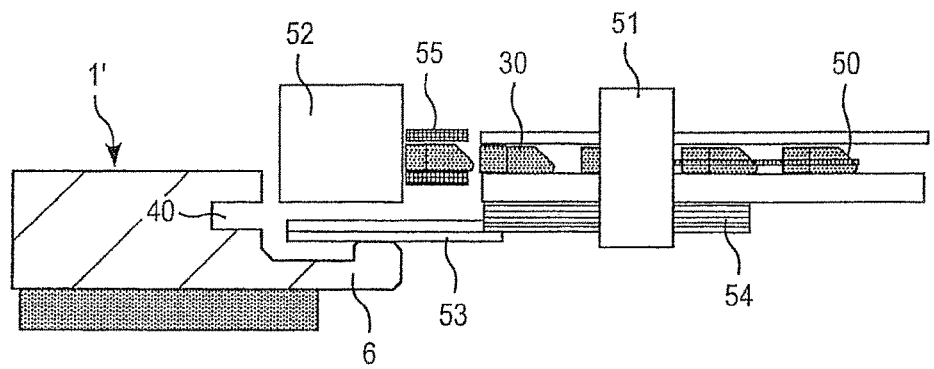
FIGS. 8a-8d show schematically how a flexible tongue could be separated, positioned and fixed to a floor panel.
Figure 8B:
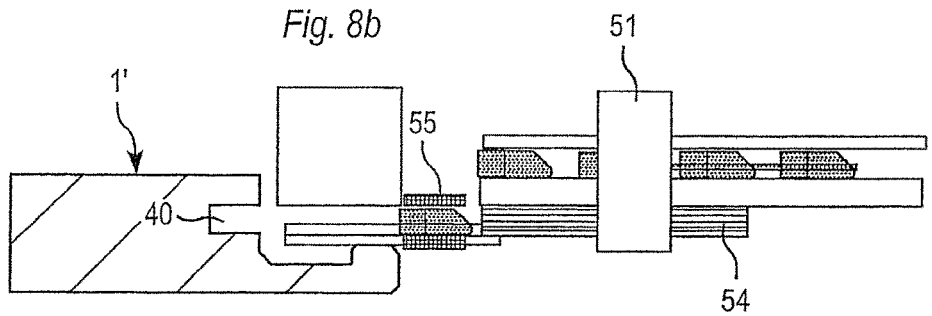
Figure 8C:
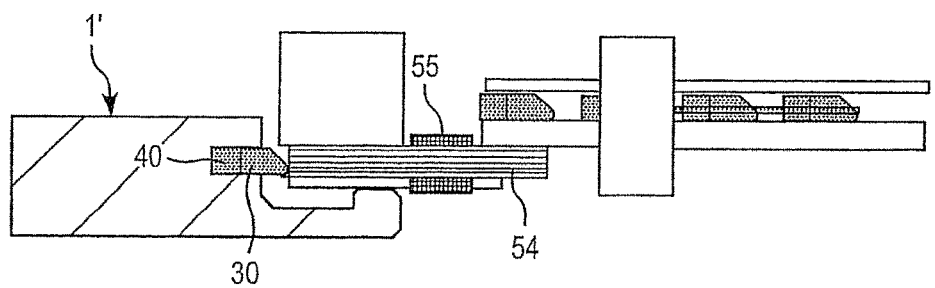
Figure 8D:
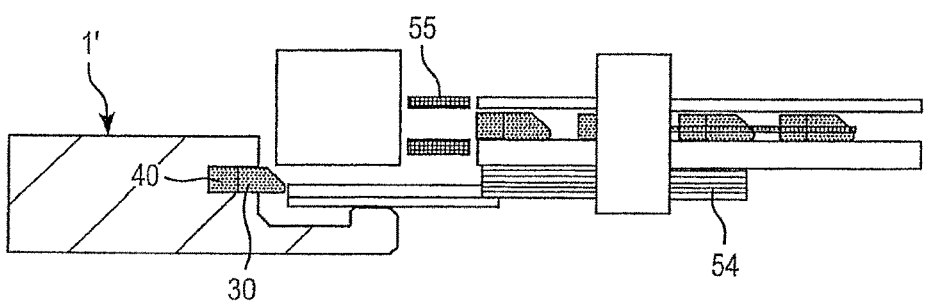
Figure 9A:
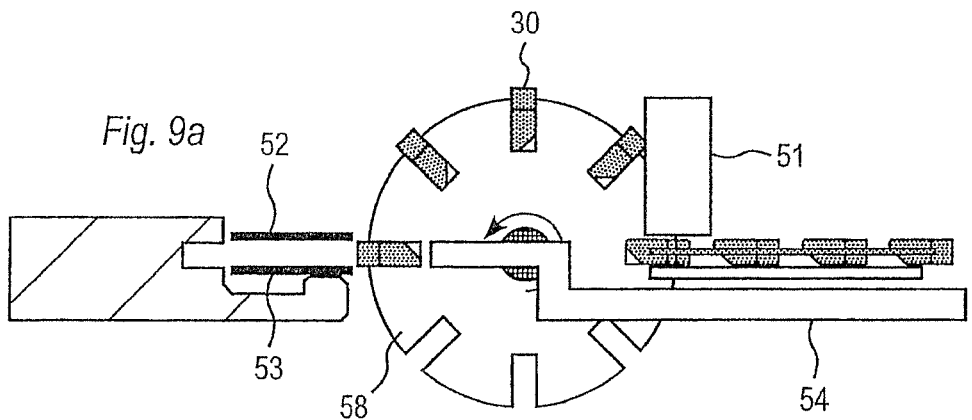
FIGS. 9a-9d show schematically how a flexible tongue could be separated, positioned and fixed to a floor panel.
Figure 9B:
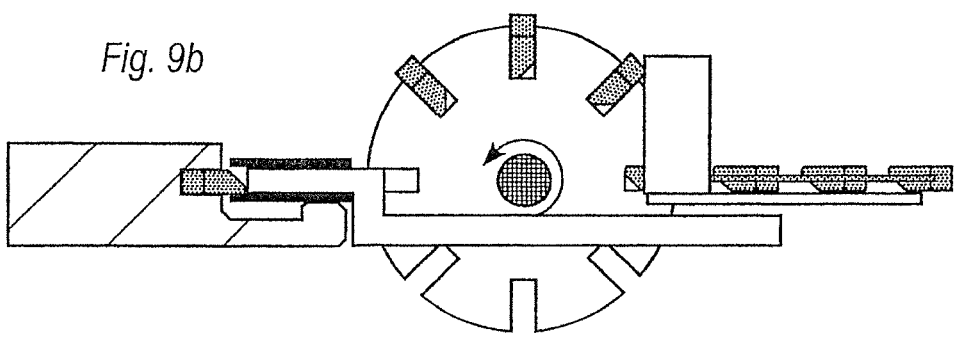
Figure 9C:
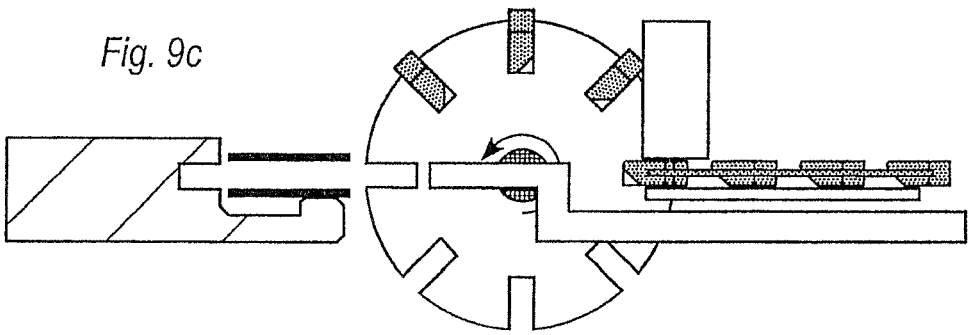
Figure 9D:
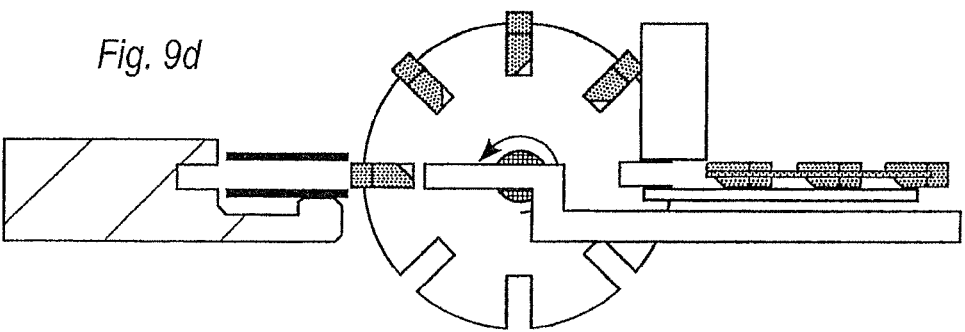
Figure 10A:
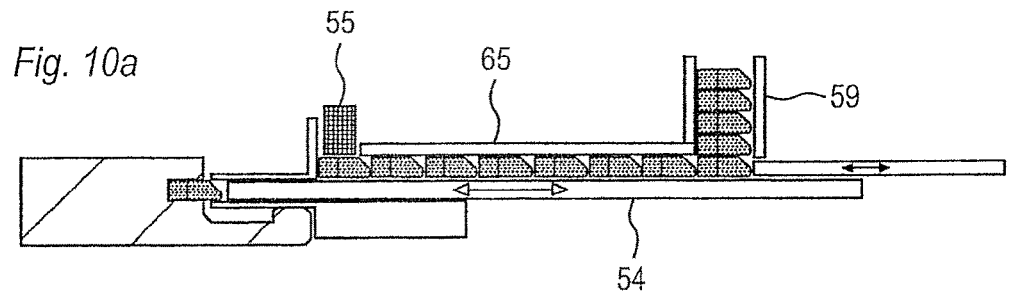
FIGS. 10a-10e show schematically how a separate flexible tongue could be positioned and fixed to a floor panel.
Figure 10B:
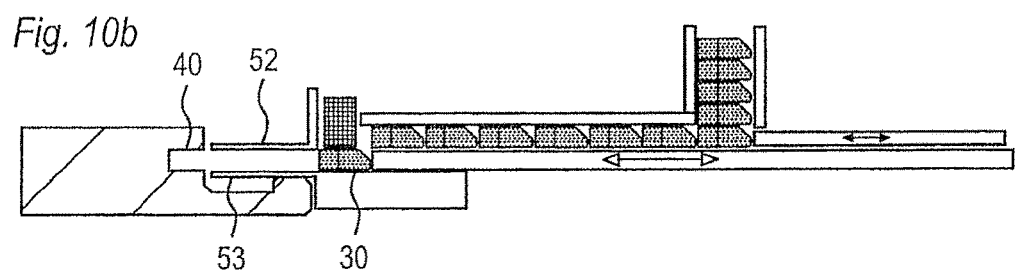
Figure 10C:
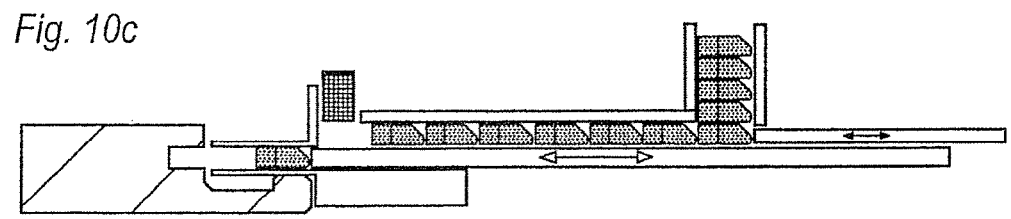
Figure 10D:
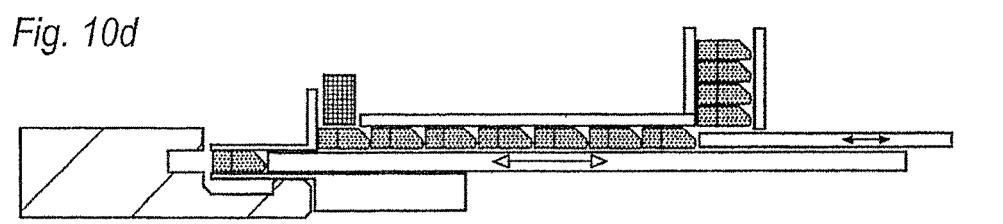
Figure 10E:
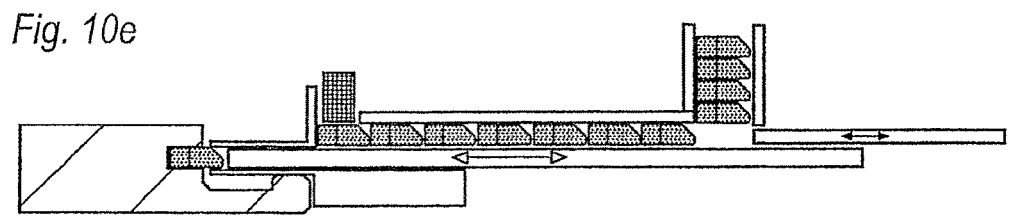

FIG. 6c shows an embodiment where the displacement groove 40 is not parallel with the horizontal plane HP. This facilitates the connection of the flexible tongue 30 into the displacement groove 40. The protruding part of the flexible tongue 30 is wedge shaped in order to press the vertical contact surface 6' and the vertical locking surface 24 against each other. The locking surfaces between the locking element 8 and the locking groove 14 are angled and have an angle which is less than 90 degree against the horizontal plane HP and the locking system could be connected with a tight fit and/or pre tension.

FIGS. 7a-7e show different embodiments of the flexible tongue 30. In FIG. 7a the flexible tongue 30 has on one of the edge sections a friction connection 36 which could be shaped for instance as a local small vertical protrusion. This friction connection keeps the flexible tongue in the displacement groove 40 during installation, or during production, packaging and transport, if the flexible tongue is integrated with the floor panel at the factory. FIG. 4b shows that the friction connection 36 keeps one edge section ES essentially still while the other edge section ES' moves along the edge. The length L' in the inner position is in this embodiment larger than the length L in locked position.

FIG. 7b shows a tongue blank 50 consisting of several flexible tongues 30 connected to each other. In this embodiment the flexible tongue 30 is made with moulding preferably injection moulding. Any type of polymer materials could be used such as PA (nylon), POM, PC, PP, PET or PE or similar having the properties described above in the different embodiments. These plastic materials could be reinforced with for instance glass fibre, Kevlar fibre, carbon fibre or talk or chalk. A preferred material is glass fibre, preferably extra-long, reinforced PP or POM.

FIGS. 7c-7e show different embodiments made by injection moulding. With this production method a wide variety of complex three-dimensional shapes could be produced at low cost and the flexible tongues 30 could easily be connected to each other to form tongue blanks 50. Of course the flexible tongue 30 could be made from metal. FIG. 7e shows that the flexible tongue could be made of an extruded or machined plastic section, which could be further shaped with for example punching to form a flexible tongue according to the invention. Materials such as plastic, metals preferably aluminium, solid wood, wood based sheet material such as HDF and compact laminate could be used.

FIG. 7f shows an embodiment, which consist of two sections 38 and 39, which are connected to each other. This will be explained more in connection to FIGS. 16d-16f.

In general any shape which allows that a part of the tongue could bend in length direction and spring back in such a way that the projecting portion could be displaced with 0.1 mm or more, will be possible to use. Normally the displacement should be 1-3 mm but very small displacements of some 0.1 mm could be enough to form a vertical locking which prevents vertical movement especially in HDF material.

FIGS. 8a-8d show schematically a production method to fix the flexible tongue to the displacement groove. In this embodiment the flexible tongue is mechanically fixed. Of course glue or mechanical devices can also be used. To simplify the understanding the panel 1' is located with its front side up. The panel could also be turned with the rear side up. The tongue blanks 50 are moved through a separation unit 51, which separates the flexible tongue 30 from the tongue blank 50. The flexible tongue 30 could then be moved to a lower level with a vertical device 55. This motion could also be combined with the separation. A pusher 54 moves the flexible tongue 30 into the displacement groove 40 and fixes it with the friction connection 36. The flexible tongue is guided over the strip 6 between an upper 52 and lower 53 guiding devices. Vacuum could also be used to connect the flexible tongue 30 to the upper 52 guiding device during the horizontal displacement into the displacement groove 40. A lot of alternatives are possible within the main principles that the flexible tongue is separated from a tongue blank containing at least two connected flexible tongues and displaced essentially parallel to its width and/or length into the displacement groove 40 where it is fixed with a friction force.

FIGS. 9*a*-9*d* show schematically an alternative production method to mechanically fix the flexible tongue to the displacement groove. The tongue blanks 50 are moved through a separation unit 51, which separates the flexible tongue 30 from the tongue blank 50. The flexible tongue 30 is in this embodiment positioned using a fan wheel 58. The fan wheel provides a safe handling of the flexible tongues. A pusher 54 moves the flexible tongue 30, via a tongue-guiding device, into the displacement groove 40 and fixes it with the friction connection 36. The flexible tongue is guided over the strip 6 between an upper 52 and lower 53 guiding devices.

FIGS. 10*a*-10*e* show schematically a further production method to mechanically fix the flexible tongue to the displacement groove. Separates tongues are stored in a vertical magazine 59 and the outermost tongue is fed in the horizontal direction by a feeding device to a vertical device 55. The tongue is fed between an upper horizontal feeding means 65 and a lower horizontal feeding means to the vertical device 55, which lower the tongue. In this embodiment the lower feeding means is also a pusher. A pusher 54 moves the flexible tongue 30, via a tongue-guiding device, into the displacement groove 40 and fixes it with the friction connection 36. The flexible tongue is guided over the strip 6 between an upper 52 and lower 53 guiding devices.

Figure 11A:
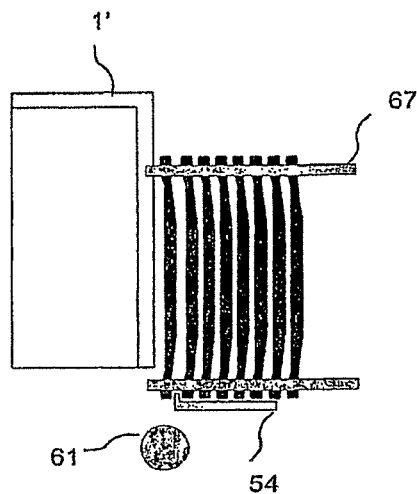
FIGS. 11a-11c show schematically how a separate flexible tongue could be displaced into a displacement groove of a floor panel.
Figure 11B:
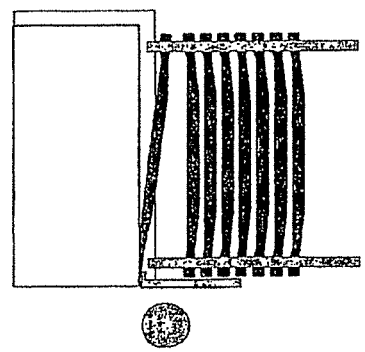
Figure 11C:
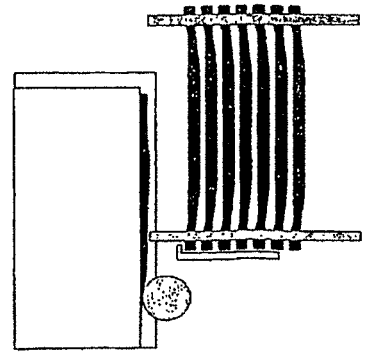

FIGS. 11*a*-11*c* show schematically a tongue-fixing device, which uses a fixing wheel 61. The tongue is fed in a feeding device 67 and a pusher 54 pushes an end of the tongue preferably provided with a friction connection 36 into the displacement groove of the floor panel. A relative motion between the panel and the fixing wheel 61, causes a gradually fixing of the whole tongue into the displacement groove, as the panel 1' passes the fixing wheel 61. An alternative embodiment comprising two or more wheels, gradually fixing the tongue.

Figure 12A:
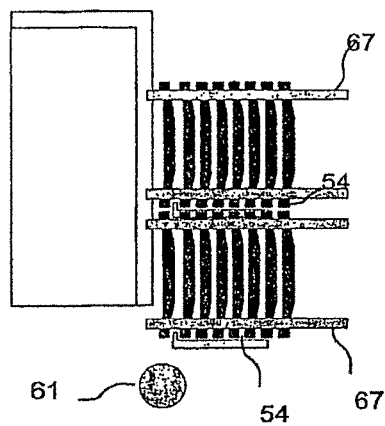
FIGS. 12a-12c show schematically how two separate flexible tongues could be displaced, at the same time, into the displacement groove of a floor panel.
Figure 12B:
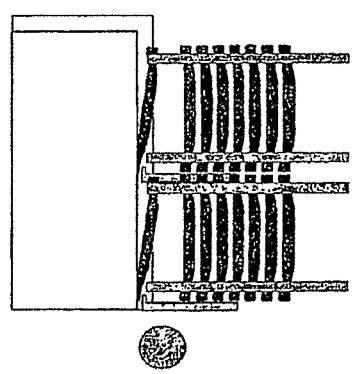
Figure 12C:
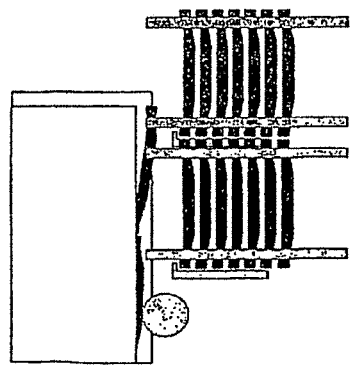

FIGS. 12*a*-12*c* show schematically an alternative tongue-fixing device, which in the same process fixes two tongues. In this embodiment the fixing device comprising two feeding devices and pushers and one fixing wheel, but alternative the fixing device comprising additional fixing wheels, pushers and feeding devices.

Figure 13A:
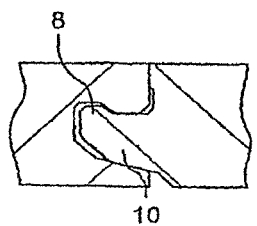
FIGS. 13a-13f show schematically different embodiments according to the invention.
Figure 13B:
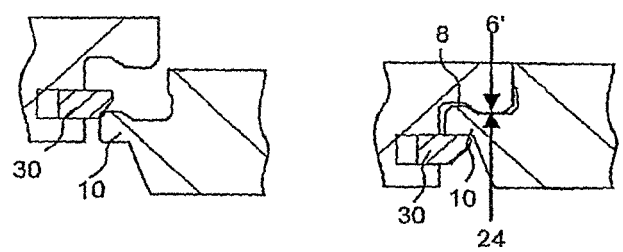
Figure 13C:
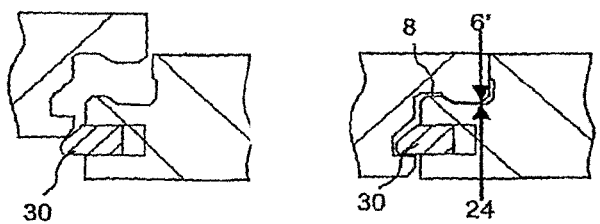
Figure 13D:
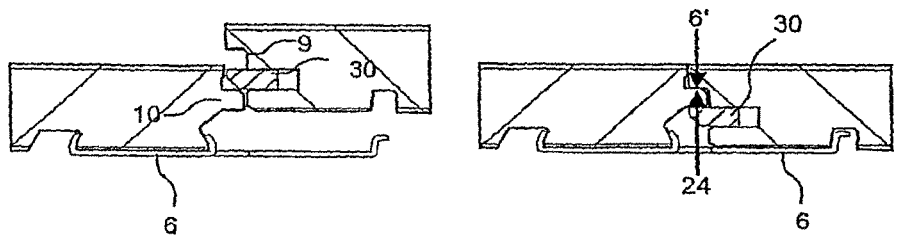
Figure 13E:
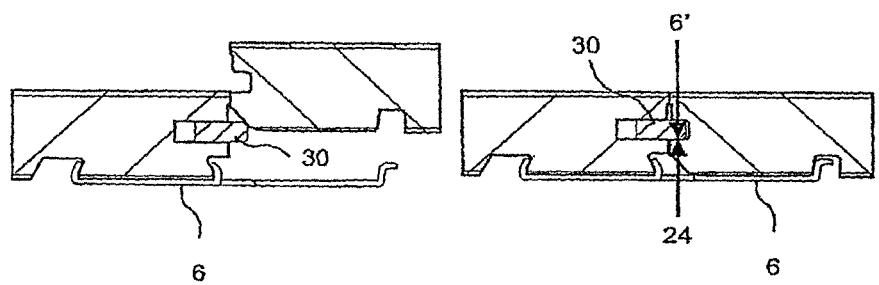
Figure 13F:
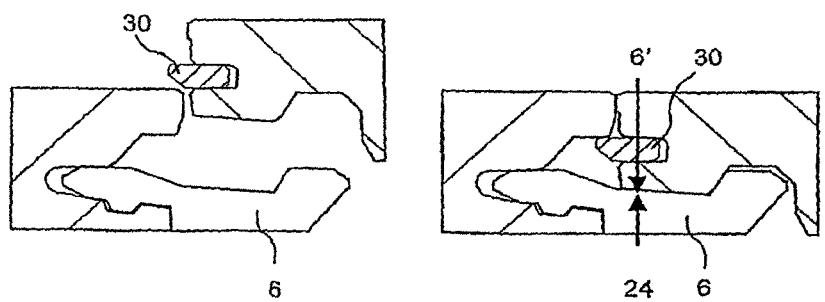

FIGS. 13*a* to 13*f* are examples which show that all known locking systems could be adjusted to vertical folding with a flexible tongue 30 according to the invention and that the flexible tongue 30 could be attached optionally to the strip or fold panel. In the embodiment of FIG. 13*e*, the strip 6 is not rigid enough to form a vertical contact surface. This could be solved by a tongue 10 and a groove 9 above the flexible tongue 3 30. Of course the vertical contact surface 6' could be a part of the tongue groove and the vertical locking surface 24 could be the projecting portion of the tongue as shown in FIG. 13*e*.

Figure 14A:
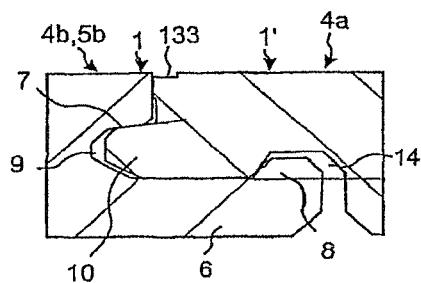
FIGS. 14a-14d show how two types of panels could be locked vertically and horizontally long side to short side with a simple angling action only.
Figure 14B:
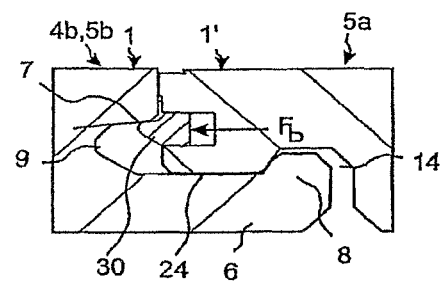
Figure 14C:
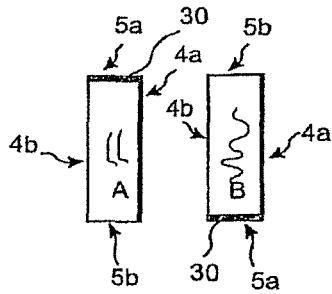
Figure 14D:
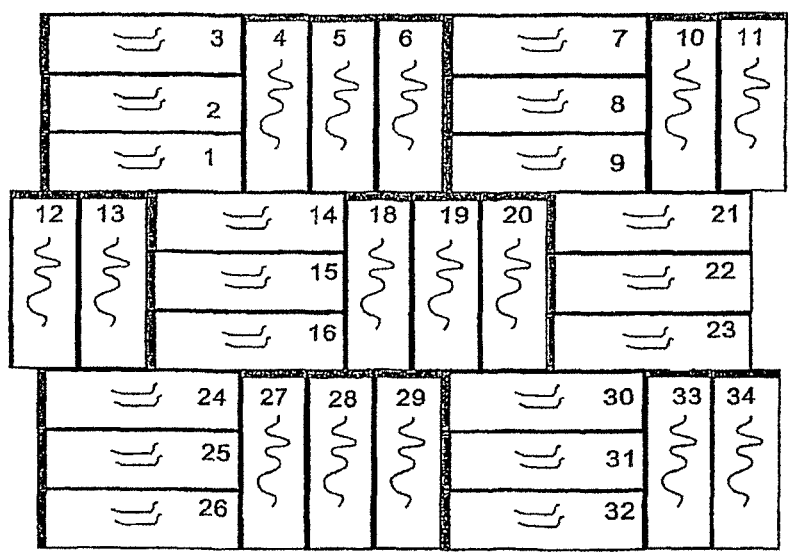
Figure 15A:
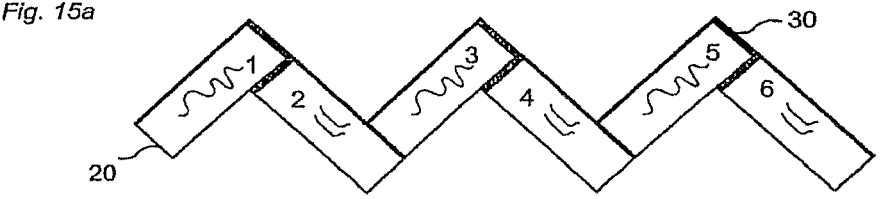
FIGS. 15a-15d show another embodiment according to the principles in FIG. 10a-10d.
Figure 15B:
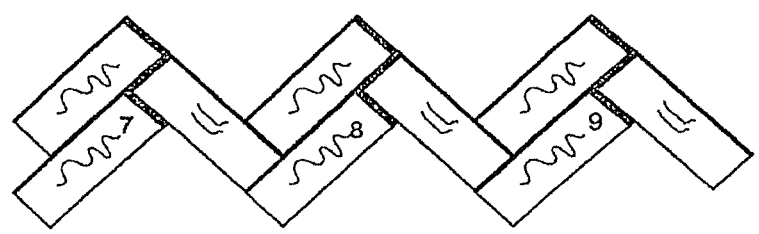
Figure 15C:
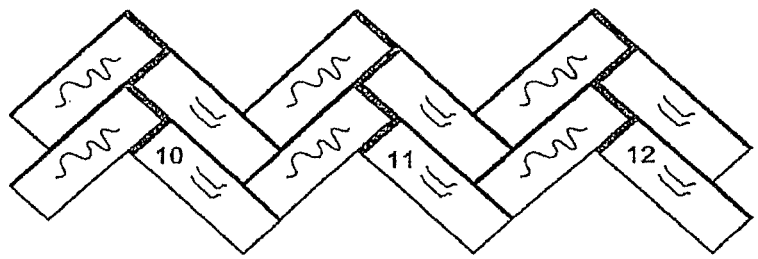
Figure 15D:
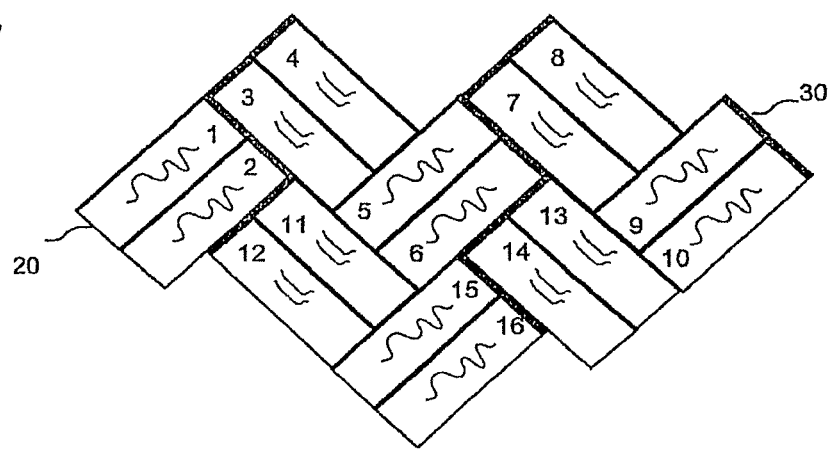

FIGS. 14*a*-14*b* show how a locking system could be designed to lock long side 4*a* to long side 4*b* with angling, short side 5*a* to short side 5*b* by vertical folding and/or angling and short side to long side with vertical folding or angling. FIGS. 14*c*-14*d* show how two panels A and B with mirror inverted locking systems could be locked to a floor with an advanced installation pattern. Panels 1-6 could be installed with angling. Panel 7 could be installed by angling the short side to the long side of panel 6. Panels 8-9 could be installed by angling. Panel 12 is installed by angling the short side. Panels 13-23 are installed by folding. Panels 24-26 are installed by angling and panels 27-34 by folding. Thanks to the flexible tongue 30 on the short side the whole floor could be installed with a simple angling action in spite of the fact that all panels are connected on all sides vertically and horizontally and all panels are connected long to long side and long to short side. This installation method could be used in connection with all types of flexible tongues and not only those embodiments that bend along the length direction. FIG. 14*b* show that the locking system could be locked with a pressure force F caused by the flexible tongue 30.

FIGS. 15*a*-15*d* show how A and B panels with a flexible tongue could be installed and locked vertically D1 and horizontally D2 in a single or double herringbone pattern with only a simple angling action.

Figure 16A:
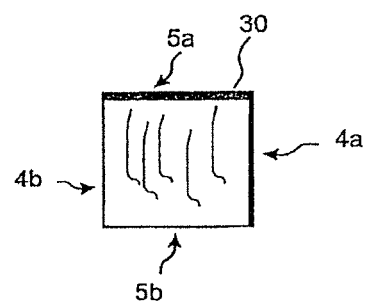
FIGS. 16a-16f show square panels and alternative locking methods.
Figure 16B:
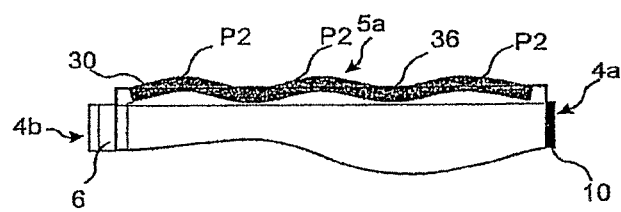
Figure 16C:
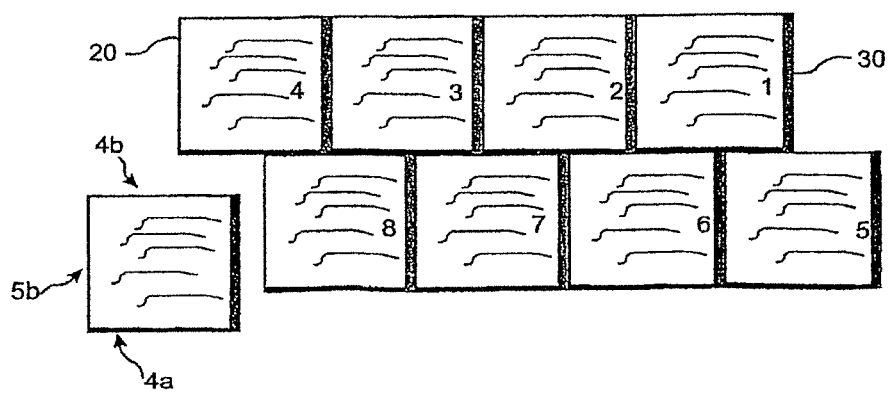

FIGS. 16*a*-16*c* show vertical folding installation with square panels. The flexible tongue 30 has several protruding parts P2. This embodiment could be used as an alternative to several separate flexible tongues when the length of the joint edge exceeds for example 200 mm. The friction connection 36 could be located for example in a middle section.

Figure 16D:
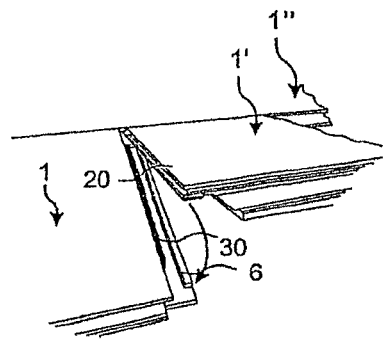
Figure 16E:
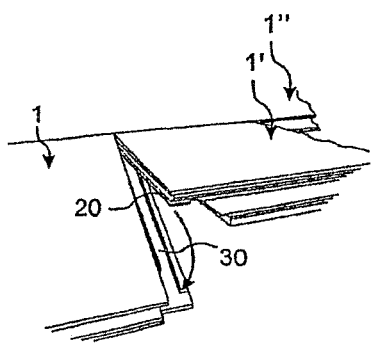
Figure 16F:
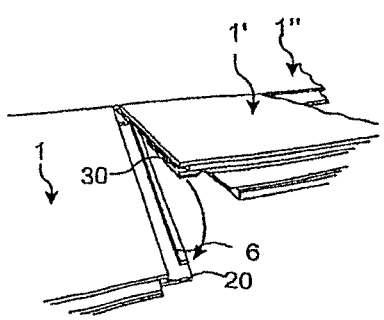

FIGS. 16*d*-16*e* show an alternative way to displace the flexible tongue. The method could be combined with a flexible tongue according to FIG. 7*f*. The new panel 1' is in angled position with an upper part of the joint edge in contact with the first panel 1" in the first row. The first panel 1', the fold panel, is than displaced towards the second panel 1 until the edges are essentially in contact and a part of the flexible tongue 30 is pressed into the displacement groove 40 as can be seen in the FIG. 16*e*. The new panel 1' is than folded down towards the second panel 1. FIG. 16*f* show that the tongue could be on the folding panel. Since the displacement of the new panel 1' presses an edge section of the flexible tongue 30 into the displacement groove 40, vertical folding will be possible to make with less resistance. Such an installation could be made with a flexible tongue that has a straight protruding part. The flexible tongue 30 does not have to bend in the length direction if it has a flexible device such as rubber that could be compressed. The bending could be replaced by a horizontal turning action where one edge section of the flexible tongue during locking is closer to the bottom 44 of the displacement groove 40 than another opposite edge section.

FIGS. 17*a*-17*d* show how a known locking system, used in large volumes on the marked, could be converted to a vertical folding, preferably in two steps. The first step is to replace the traditional tongue 10 with a flexible tongue 30. In this embodiment the locking systems will be compatible which means that an old and new panel could be locked to each other. The tongues could be fixed to either the fold panel (see FIG. 17*c*) or the strip panel (see FIG. 17*d*). After a while when all products in the shops are sold, the groove 9 of the strip part could be adjusted.

Within the invention a lot of alternatives are possible to accomplish vertical folding with a flexible tongue.

A flexible tongue could be produced according to the same principle as known mechanical devices, which create a spring effect similar to locking devices used in doors, windows, furniture, cars and mobile phones. The flexible tongue with these mechanical devices could be formed with dimensions suitable for 6-15 mm floorings, especially wood floorings, and inserted into the edge. FIG. 18 shows that the flexible tongue (30) could for example be mounted in a separate sliding section 56 made of plastic or metal or any other suitable material and containing a compressible or flexible rubber, metal or plastic component (57) or similar able to create the spring effect. This sliding section 56 could be connected into the edge of the floor panel in a holding groove 40' which in this embodiment is rounded and has a shape similar to a part of a rotating saw blade. Since the holding groove 40' only is formed in a part of the short side edge, it could be made rather deep and the edge will still have sufficient strength. A preferable feature of this embodiment is that the deepest part of the holding groove 40' is only located in a part of the edge. Contrary to the other embodiments the holding groove 40' is not parallel with the joint edge and does not cover the whole edge. Of course other shapes are possible and the parallel groove is not excluded.

Especially on long and wide floor panels rather complicated devices could be used since only 2-4 pieces are required per m2 of flooring. Even with a rather high unit price, the advantages with vertical folding are considerable and could overcome a rather high cost for the locking system. Due to the fact that the short sides are not sawn very often, metal components could also be used and these components could be formed in such a way that they are easy to remove from the floor panel if the short side edge must be sawn.

In floor panels with a width of about 20 cm a flexible tongue with a length of a few cm is enough if it is positioned in the middle part of the short side about 6-9 cm from the corner section.

The flexible tongue could also be made of one single component as described in the embodiment above and with a thickness of about 1 mm only and could be used to connect floorboards with a thickness down to 4 mm. A locking system with the flexible tongue, according to the inventions, is also very suitable for connecting thicker floorboards or about 10-15 mm, especially wood and laminate floorboards. The displacement groove 33 and/or the tongue groove 20, could be formed in separate materials, which are connected as an edge portion to the core. In engineered wood floors, with for instance a lamella core, the edge portion could be made of e.g. HDF, plywood, plastic or special hard wood, which are stronger than the core material. This separate edge portion could be fixed between the top layer and the balancing layer.

All features of the embodiment described above could be combined with each other or used separately. The flexible tongues could be combined with all shown displacement or holding grooves. The locking systems could be used in any shown joint or floor panel. The system according to FIG. 18 could for example be used in floor panels described in FIGS. 14*a*-14*d*. The tongue as shown in FIG. 7*f* could also have a shape as shown in FIG. 7*b* and it could be made to bend in the length direction where this bending is partly supported by a flexible material 38. The locking strips could in all embodiments be made of a separate material or in one piece. Part of the strip 6 in FIG. 18 could be removed under the plastic component 56 to facilitate fixing to the joint.

Figure 18E:

FIGS. 18*a*-18*c* show different shapes of the flexible tongue. FIG. 18*a* shows one embodiment with an essentially sine shaped tongue, comprising two periods, and straight parts at the down periods and at the top periods. Second and third embodiments comprising two periods with different lengths of the top periods. A fourth embodiment comprising one period and a fifth embodiment comprising one period involving an asymmetric top period. The different lengths of the periods and asymmetry is used to facilitate the connection, and lower resistance. FIG. 18*b* shows an embodiment before the ingates are removed and with recesses 66 at the inner part, which increase the flexibility of the tongue. FIG. 18*c* shows an embodiment with different radius at the inner part R3, at the bevel R2 and at the outer part R1. The figure shows that the total width TW of the tongue could vary between a position when the panel is not connected TWS and a position when the panel is connected TWE. In the connected position is in this embodiment the tongue slightly compressed and pretensioned and therefore also shows a different shape. In an embodiment without the straight part at the top period of the sine shaped tongue it is possible to create a higher degree of pretension, at least initially after installation, in the connected position, which might be an advantage. After a while the pretension might decrease. FIGS. 18*d*-18*f* show embodiments to solve the problem which occur when the panel is split. In one embodiment the tongue is replaced by another tongue (see FIGS. 18*d* and 18*f*), which is shorter. In another embodiment (see FIG. 18*e*) the shape of the tongue is adopted so that the tongue could be cut and still work.

Figure 19A:
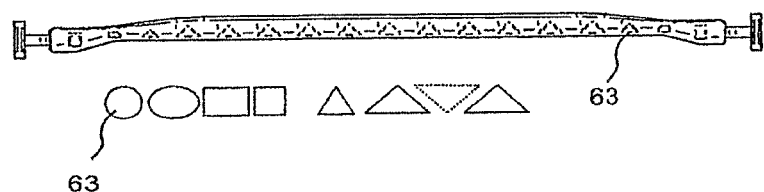
FIGS. 19a-19b show embodiments of the flexible tongue with various shapes of indentations
Figure 19B:
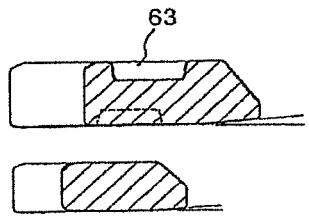
Figure 19C:
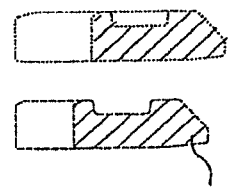
FIGS. 19c-19d show an embodiment for compensating for production tolerances of the flexible tongue
Figure 19D:
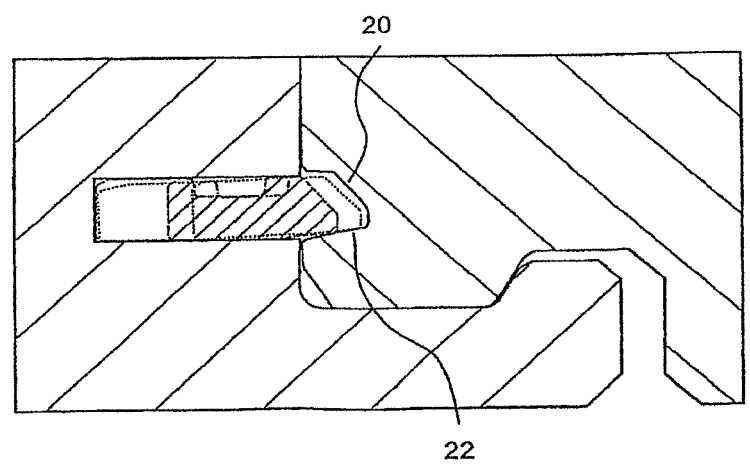
Figure 21A:
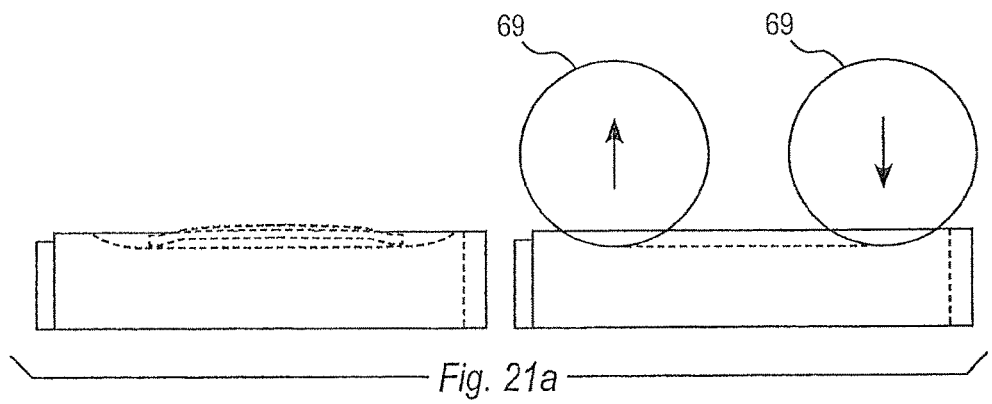
FIGS. 21a-21d show another embodiment with a displacement groove, which is not continuous over the whole edge FIGS. 22a-22d various embodiments of the tongue blank and separate flexible tongues
Figure 21B:
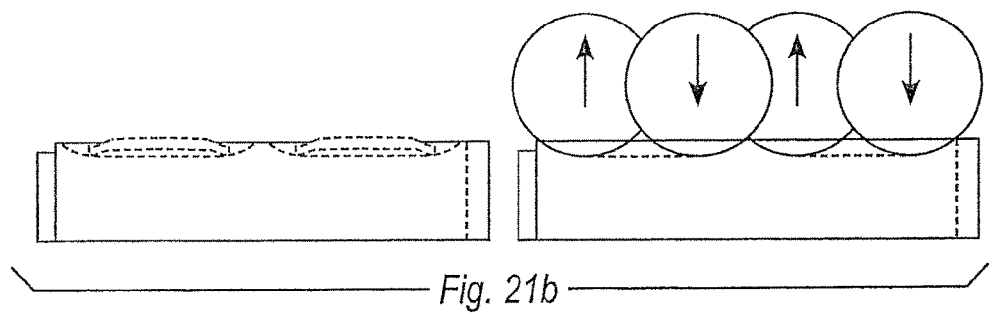
Figure 21C:
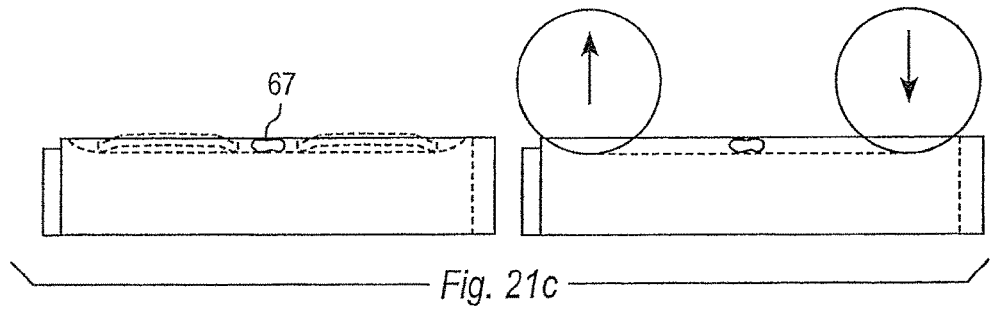
Figure 21D:
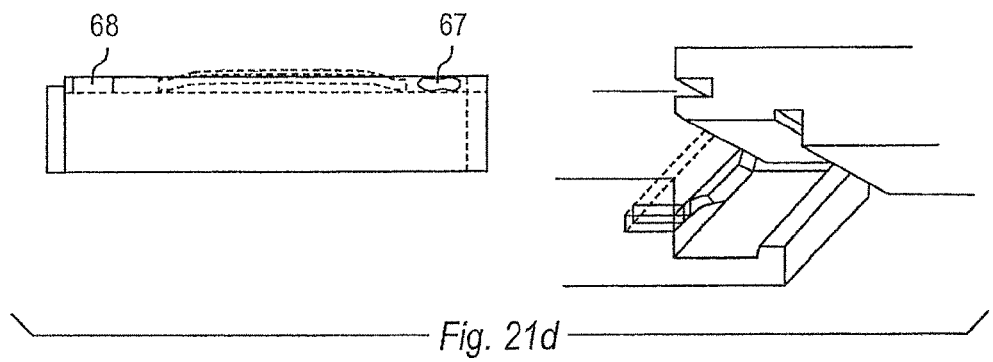

FIGS. 19*a*-19*b* show an embodiment of the tongue with indentations 63, of different shapes. The indentation counteracts the effect of shrinkage by moulding, and could also be useful to help orientation of the tongue, when handling the tongue in connection with fixing. The bottom of the tongue is a suitable place for identification text or contact surface of a pusher (e.g. when removing the tongue from a mould), since it doesn't change the sliding/displacing characteristics of the tongue. FIG. 19*d* shows how different sizes of the tongue, due to production tolerances, could be compensated by a bevel at the lower displacement surface 64 of the tongue and an inclined tongue locking surface of the tongue groove 22.

FIGS. 20*a*-20*d* illustrate that various types, lengths and numbers of tongues could be combined and fixed to one displacement groove. An advantage is that different combination could be used to create different strength and characteristics of the locking system, which could be adapted to different types of panels. A use of several tongues could also replace product (panel) specific lengths of the tongues.

FIGS. 21*a*-21*d* illustrate embodiments with non-continuous displacing grooves. The non-continuous displacing groove could be processed by a jumping head 69 or created by inserting a filler 67 or inserting and fastening, e.g. by friction or gluing, of a divider 68.

Figure 22A:
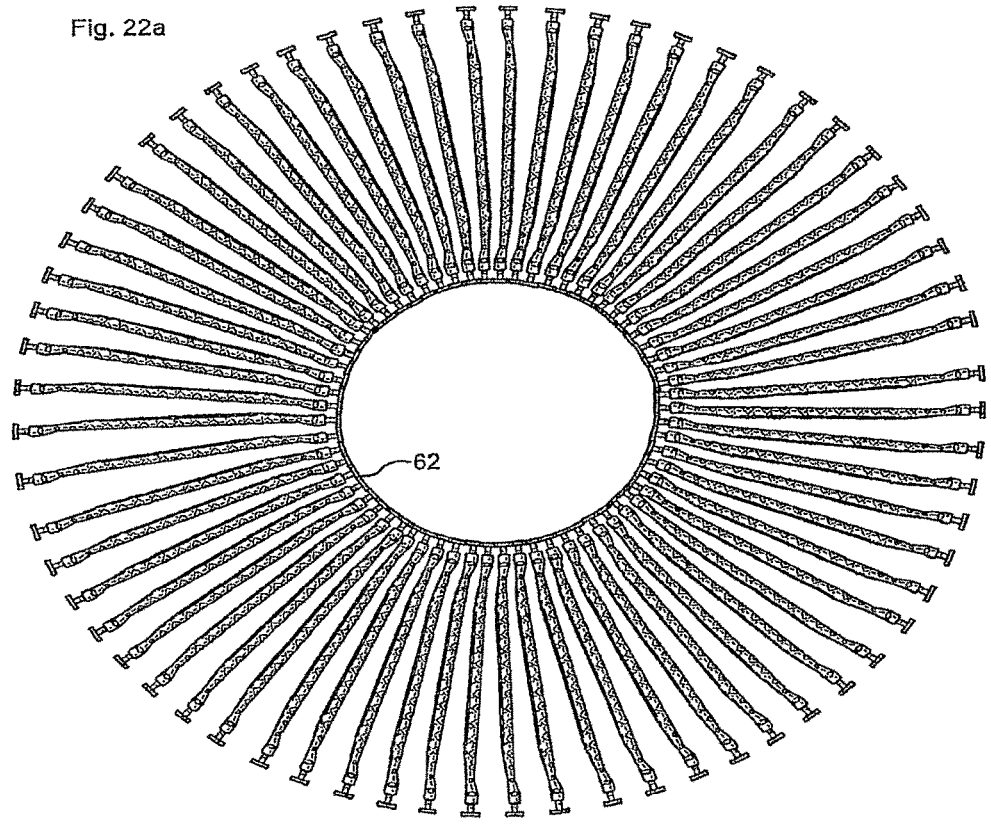
Figure 22B:
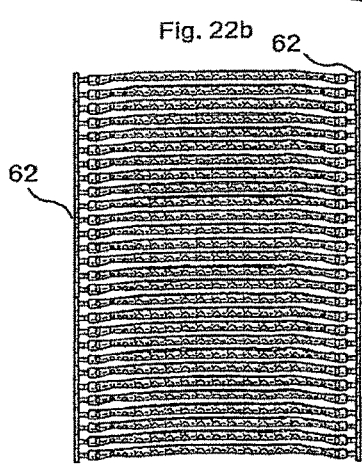
Figure 22C:
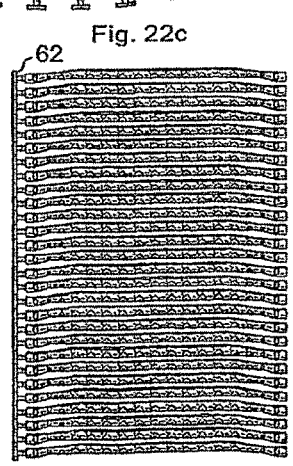
Figure 22D:
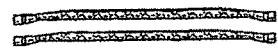

FIGS. 22*a*-22*c* illustrate embodiments of a tongue blank, straight or circular and with ingates at one or both ends of the tongue. The tongue could also be handled separately according to FIG. 22*d*.

Figure 23A:
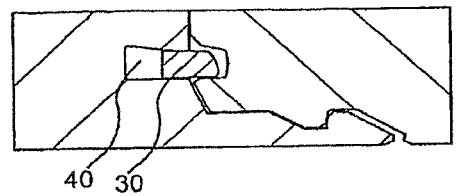
FIGS. 23a-23g show the flexible tongue in combination with different embodiments of the displacement groove, the locking strip, the locking groove and the lower contact surface of locking groove panel.
Figure 23B:
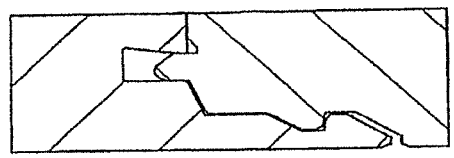
Figure 23C:
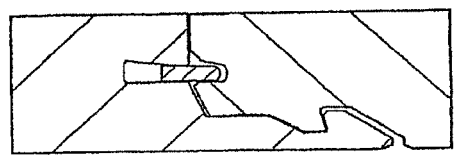
Figure 23D:
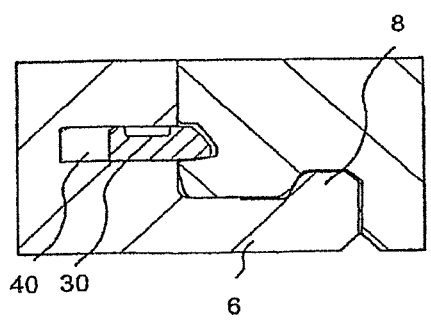
Figure 23E:
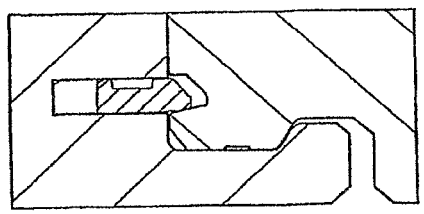
Figure 23F:
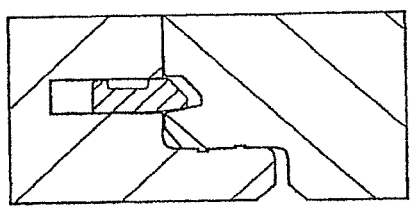
Figure 23G:
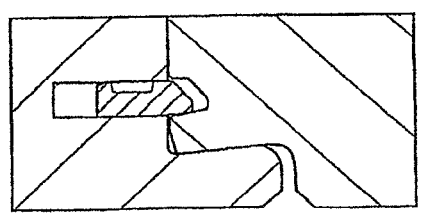
Figure 24A:
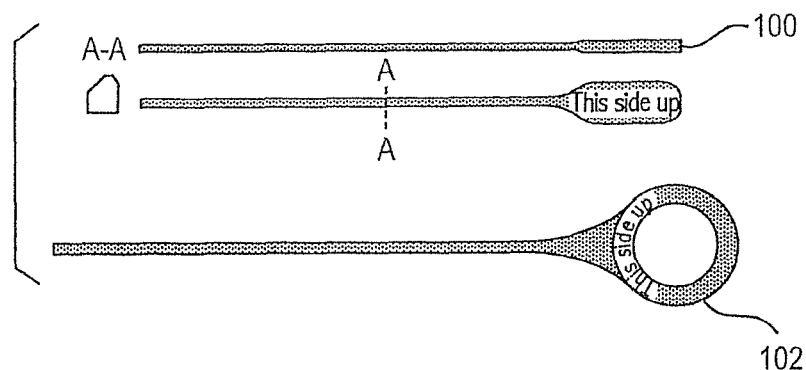
Figure 24B:
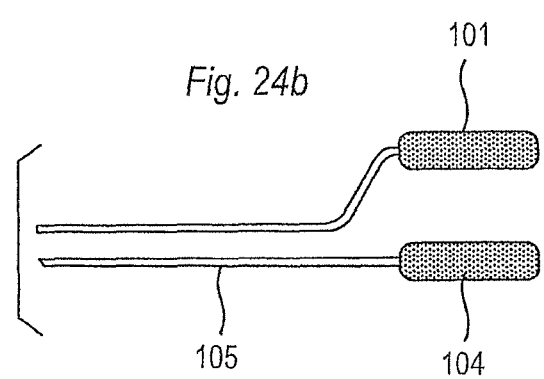
Figure 24C:
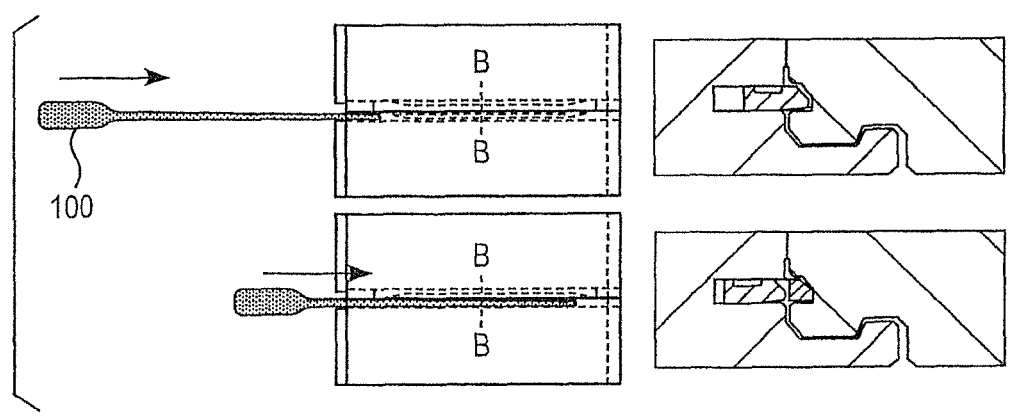

FIGS. 23*a*-23*g* show different embodiments of a mechanical locking system in combination with a flexing tongue. FIGS. 23*a* and 23*b* show one embodiment of the same panel at the short side 23*a* and at the long side 23*b*. FIG. 23*c* shows an embodiment, which is not possible to take up with angling. FIGS. 23*a*-23*d* show an embodiment of a displacing groove with an inclined upper displacing groove surface, which counteract the effect of humidity related shrinking and swelling of the panel and reduces the risk of jamming of the tongue.

FIGS. 24*a*-24*g* show embodiments of a tool 100-103 to be used when taking up panels with the flexible tongue. The tool comprising a handle part 104 and a tool part 105, which is adapted to be inserted in the tongue groove or the displacement groove of a panel. In one embodiment the tongue is compressed when the tool 100 is inserted and pushed out of the tongue groove. In another embodiment (FIGS. 24*d*-24*e*) the tool part 103 comprising a protrusion or recess 106 at the one end of the tool, which is adapted to catch an end of the tongue, preferably provided with a recess or protrusion. This embodiment pulls out the tongue.

In order to increase the accessibility the tool might also comprise a curved part and/or produced of an elastic material, e.g. elastic bendable plastic or metal.

An alternative, for which a tool not is necessary (FIG. 24e), is that the tongue has an end part, outside the displacement and tongue groove, such that it is visible when the panels are connected. The end part is adapted to be easy to grab and used when pulling out the tongue.

A floor panel with a flexible tongue could also be taken up using the conventional methods adapted to taking up floor panels with a conventional non-flexible tongue, e.g. angling-angling, angling-sliding, snapping-sliding or snapping-angling.

The method to produce a separate tongue, which is inserted into a groove, could of course be used to save material and improve friction properties even if the tongue is not flexible or displaceable. The methods and principle could also be used together with a flexible tongue that could be bent in vertical direction up and/or down during locking. Extruded V- or U-shaped sections, where an outer or inner part is flexible and which could cause at least a part of the section to move essentially horizontally during the vertical folding could also be used to lock floorboards in a vertical direction, according to the same basic principal as the above described flexible tongue.

The system could be used to connect tile shaped panes installed on a wall and. The tile could be connected to each other and to a locking member fixed to the wall.

The flexible tongue according to the invention may be used without the locking strip to accomplish vertical locking only.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

The invention claimed is:

1. A method to install and connect a third panel to a first panel in a first row in a horizontal and a vertical direction and to a second panel in a second row in a horizontal and a vertical direction, wherein the third panel or the second panel comprises a flexible tongue in a displacement groove, the method comprising the steps of:
   bringing the third panel to an angled position with an upper part of a first joint edge of the third panel in contact with a joint edge of the first panel in the first row;
   displacing the third panel, while the third panel is at the angled position, to move along the joint edge of the first panel in the horizontal direction towards the second panel until at least a part of a second joint edge of the third panel is essentially in contact with a part of a corresponding joint edge of the second panel and a part of the flexible tongue is pressed into the displacement groove; and
   folding down the third panel vertically towards the second panel and thereby locking the third panel to the first and the second panels.

2. The method as claimed in claim 1, wherein the flexible tongue comprises a straight protruding part that is straight along the second joint edge of the third panel or along the corresponding joint edge of the second panel.

3. The method as claimed in claim 1, wherein the flexible tongue comprises an elastic part.

4. The method as claimed in claim 3, wherein the elastic part is compressible.

5. The method as claimed in claim 3, wherein the elastic part compiles rubber.

6. The method as claimed in claim 1, wherein the flexible tongue bends in a length direction along the second joint edge of the third panel or along the corresponding joint edge of the second panel.

7. The method as claimed in claim 1, wherein the flexible tongue comprises an extruded V- or U-shaped section.

8. The method as claimed in claim 1, wherein the third panel is locked and unlocked to the second panel with angling.

9. The method as claimed in claim 1, wherein at least a portion of the flexible tongue during the folding undergoes a first displacement and a second displacement in the displacement groove,
   the first displacement is effected by the folding of the third panel, wherein at least the portion of the flexible tongue is bent in the horizontal direction, and
   the second displacement is accomplished substantially by a spring effect caused by the flexible tongue bending towards its initial position.

10. The method as claimed in claim 1, wherein the third panel comprises the flexible tongue and the displacement groove.

11. The method as claimed in claim 1, wherein the third panel is displaced in the horizontal direction towards the second panel until the second joint edge of the third panel overlies the corresponding joint edge of the second panel.

12. The method as claimed in claim 1, the third panel is displaced to move along the joint edge of the first panel in the horizontal direction while the third panel is in the angled position with respect to the first panel.

* * * * *